United States Patent
Bangma et al.

(10) Patent No.: US 9,832,518 B2
(45) Date of Patent: *Nov. 28, 2017

(54) SYNCHRONIZATION OF PROCESSING MEDIA STREAMS BY ONE OR MORE MEDIA PROCESSING DEVICES

(71) Applicants: Koninklijke KPN N.V., The Hauge (NL); Nederlandse Organisatie voor Toegepast-Natuurwetenschappelijk Onderzoek TNO, s-Gravenhage (NL)

(72) Inventors: Menno Bangma, The Hauge (NL); Ray Van Brandenburg, The Hauge (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,943

(22) PCT Filed: Nov. 17, 2014

(86) PCT No.: PCT/EP2014/074774
§ 371 (c)(1),
(2) Date: May 11, 2016

(87) PCT Pub. No.: WO2015/071461
PCT Pub. Date: May 21, 2015

(65) Prior Publication Data
US 2016/0269771 A1    Sep. 15, 2016

(30) Foreign Application Priority Data
Nov. 15, 2013  (EP) .................................. 13193086

(51) Int. Cl.
H04N 21/43   (2011.01)
H04N 21/242  (2011.01)
H04N 21/231  (2011.01)
H04N 21/41   (2011.01)

(52) U.S. Cl.
CPC ... H04N 21/4307 (2013.01); H04N 21/23106 (2013.01); H04N 21/242 (2013.01); H04N 21/4126 (2013.01)

(58) Field of Classification Search
None
See application file for complete search history.

(56) References Cited

U.S. PATENT DOCUMENTS

2009/0249222 A1* 10/2009 Schmidt ............. H04N 21/2368
                                              715/751
2011/0320627 A1* 12/2011 Landow ........... H04N 21/47202
                                              709/231
(Continued)

FOREIGN PATENT DOCUMENTS

FR    2 988 254 A1    9/2013
WO    2011/144775 A1  11/2011
(Continued)

OTHER PUBLICATIONS

PCT International Search Report and Written Opinion; PCT International Application No. PCT/EP2014/074774; dated Feb. 17, 2015.
(Continued)

*Primary Examiner* — Hoang-Vu A Nguyen-Ba
(74) *Attorney, Agent, or Firm* — McDonnell Boehnen Hulbert & Berghoff LLP

(57) ABSTRACT

Methods, media processing devices and cache nodes for enabling instant synchronization of processing of data units of a primary media stream and of one or more secondary streams by at least one media processing device are
(Continued)

described. The method may comprise the steps of: selecting a primary media stream that is broadcasted by a broadcast source, said primary media stream being associated with at least one secondary stream; receiving data units of said primary media stream and data units of said at least one secondary media streams; providing cache timing information associated with a time delay between the availability by said at least one media processing device to data units of said primary stream and to corresponding data units of said secondary stream; and, requesting one or more cache data units from at least one cache server on the basis of said cache timing information, wherein at least part of said cache data units correspond to data units of said primary media stream that, at the time the primary media stream was selected by said media processing device, were already broadcasted by said broadcast source.

16 Claims, 12 Drawing Sheets

(56) References Cited

U.S. PATENT DOCUMENTS

2012/0002111 A1\* 1/2012 Sandoval ................. H04N 5/06
348/521

2012/0011550 A1\* 1/2012 Holland ............. H04N 21/4126
725/78
2013/0176493 A1 7/2013 Khosla
2013/0305292 A1\* 11/2013 Chen .................... H04N 21/472
725/54

FOREIGN PATENT DOCUMENTS

WO 2012/005695 A1 1/2012
WO 2012/168365 A1 12/2012

OTHER PUBLICATIONS

European Search Report, European Patent Application No. 13193086.9, dated Apr. 23, 2014.
"Digital Video Broadcasting (DVB); Specification for the Carriage of Synchronized Auxiliary Data in DVB Transport Streams", ETSI TS 102 823, V1.1.1, Nov. 2005, pp. 1-37.
Schulzrinne, H. et al., Real Time Streaming Protocol (RTSP), Network Working Group, Request for Comments 2326, Apr. 1998, pp. 1-86.
"Digital Video Broadcasting (DVB); Companion Screens and Streams; Part 2: Content Identification and Media Synchronisation", Section 5.5 and B6, DVB Document A167-2, Oct. 2015, pp. 1-166.

\* cited by examiner

```
<MPD
type="static"
mediaPresentationDuration="PT3256S"
minBufferTime="PT1.2S"
profiles="urn:mpeg:dash:profile:isoff-on-demand:2011">
<DVB_ProgramID>0x10211</DVB_ProgramID>        802

<CachePath>http://cache.example.com</CachePath>    804

<Period>
  ...
<Period>
</MPD>
```

FIG. 8A

```
<MPD
type="static"
mediaPresentationDuration="PT3256S"
minBufferTime="PT1.2S"
profiles="urn:mpeg:dash:profile:isoff-on-demand:2011">
<Sync_PID>0x0101</Sync_PID>        808

<CachePath>http://cache.example.com</CachePath>    806

<Period>
  ...
<Period>
</MPD>
```

FIG. 8B

```
<Ait>
  <Pid>0x1B66</Pid>
  <TableId>0x74</TableId>
  <SectionSyntaxIndicator>0x1</SectionSyntaxIndicator>
  <TestApplicationFlag>0x0</TestApplicationFlag>
  <ApplicationType>0x10</ApplicationType>
  <VersionNumber>0xB</VersionNumber>
  <CurrentNextIndicator>0x1</CurrentNextIndicator>
  <SectionNumber>0x0</SectionNumber>
  <LastSectionNumber>0x0</LastSectionNumber>
  <ApplicationInformation>
    <ApplicationIdentifier>
      <OrganisationId>0x00</OrganisationId>
      <ApplicationId>0x00</ApplicationId>
    </ApplicationIdentifier>
    <ApplicationControlCode>0x1</ApplicationControlCode>
    <!-- descriptor_tag=0x15 -->
    <SimpleApplicationLocationDescriptor>
      <InitialPath>http://example.com/app/hbbtv_dvb</InitialPath>
    </SimpleApplicationLocationDescriptor>
    <RetransmissionCacheDescriptor>                     902
      <Host>cache.example.com</Host>    904
      <AdditionalSettings>
         ...                                            906
      </AdditionalSettings>
    </RetransmissionCacheDescriptor>
    <AuxiliaryContentDescriptor>                        908
      <MPDPath>http://example.com/content/second_content.mpd</MPDPath>    910
    </AuxiliaryContentDescriptor>
  </ApplicationInformation>
</Ait>
```

FIG. 9

SYNCHRONIZATION OF PROCESSING MEDIA STREAMS BY ONE OR MORE MEDIA PROCESSING DEVICES

CROSS REFERENCE TO RELATED APPLICATIONS

The present application is a national stage entry of, and claims priority to, PCT/EP2014/074774, filed on Nov. 17, 2014, which claims priority to European Patent Application EP 13193086.9, filed in the European Patent Office on Nov. 15, 2013, both of which are hereby incorporated in their entirety herein by reference.

FIELD OF THE INVENTION

The invention relates to synchronization of data processing of media streams by one or more media processing devices, and, in particular, though not exclusively, to a methods for enabling instant synchronization of data processing associated with media streams by one or more media processing devices, a media processing device and a cache node for enabling such instant synchronization and a computer program product for using such method.

BACKGROUND OF THE INVENTION

With the growing popularity of Internet video and Internet TV, there is an increasing need for streaming solutions that allow a synchronized user experience for users between different types of streams received by one or more devices. For example, a Hybrid Broadcast Broadband TV (HBBTV) media processing device may be capable of receiving and processing a primary stream, e.g. a live broadcast, in parallel with one or more secondary streams wherein the secondary streams may convey additional information, such as an additional audio stream, a foreign language subtitle stream, or an interactive "event" stream, to provide added value to the primary TV signal.

Furthermore, in so-called second screen or companion screen applications, the primary stream may be rendered by a first media processing device, e.g. a TV or the like, and the content of the secondary stream may be rendered by a second media processing device, e.g. an electronic table or an audio system associated with the TV. When processing a primary and secondary stream in the above-mentioned scenarios, a temporal relation between the primary and secondary stream needs to be maintained in order enable the media processing device to render these streams in sync to the user. Techniques for synchronization of one or more streams by a single media processing device is usually referred to as inter-stream synchronization which should be distinguished from other known synchronization techniques such as intra-stream synchronization and inter-destination media synchronization.

Certain problems may occur implementing such scenarios. One problem is associated with the fact that often the primary and secondary stream are being transmitted as independent streams to the media processing device(s) on the basis of different access technologies (e.g. the secondary stream is delivered on the basis of MPEG DASH as a third-party over-the-top (OTT) service, while the primary stream is delivered as a DVB-type broadcast service). Hence, data units of the primary and secondary stream may have different data formats, originate from different media sources and experience different network delays during transmission.

A further problem may arise in cases where the secondary stream is lagging behind in time with respect to primary stream. For example, in case the primary stream is a live stream, often the secondary stream can only be created after the content of the primary stream is made available by broadcasting. For example, if the secondary stream is created by a third-party, the third party content creator will receive the primary stream at approximately the same time as the media processing devices. An example of such secondary stream is a video stream of a sign language interpreter for the deaf or hearing impaired, foreign language subtitles created on the fly, or third party commentary tracks for a football match, or foreign language audio translations of a live news feed. Creating such secondary stream will take a few seconds by the third party content creator, after reception of the primary stream.

In that case, the secondary content is only available many seconds after the corresponding primary content has been received, so that in order to realize synchronization between the primary and the secondary stream, the primary stream has to be delayed by the media processing device for a relatively large amount of time. Hence, once a user activates the secondary stream, or switches to a new primary stream, the screen will freeze or rewind for a couple of seconds to allow the secondary stream to catch up, thereby seriously degrading the user experience. This problem may be referred to as the instant inter-stream synchronization problem.

Typically synchronization is realized in two steps. First the asynchronicity between receivers is determined, by for example collecting individual status reports from the media receivers (e.g. the DVB and/or IP receivers) on the current timing of the content being received (e.g. the last timestamp received for a particular media stream). Thereafter, in a second step, the synchronicity is corrected. The source, receiver or an intermediate node adjusts the playout or throughput based on the current and desired playout position. This adjustment can be done by either delaying or advancing the media stream (or local buffer) until the synchronization is restored.

Various known techniques such as watermarking, audio fingerprinting or matching of timestamps may be used to synchronize a secondary stream with a primary stream. For example, Nielsen and Civolution use audio fingerprinting or audio watermarking respectively to synchronize an interactive feed with the live broadcast. However, these techniques do not provide a solution for the instant inter-stream synchronization problem where the interactive content (the secondary stream) is only available seconds after the primary stream.

WO211144775 describes a method for synchronizing real-time subtitling with audio by either creating a new stream in the network on the basis of the primary stream and the secondary stream that carries the subtitles or by temporarily delaying the primary steam in the TV until the secondary stream arrives. Forming a new stream in the network will be difficult to implement if the primary and secondary stream are based on different, non-related transport protocols, e.g. a DVB primary stream and an MPEG-DASH or an RTP secondary stream. Furthermore, it will double the bandwidth that is required to broadcast a television channel to receivers. Delaying the primary stream at the receiver side will require a user to wait thereby considerably degrading the user experience.

Hence, there is a need in the art for improved methods and systems that enable synchronized data processing a primary stream, in particular a primary broadcast stream, and a secondary stream by a receiver wherein the secondary stream becomes available to the receiver only many seconds after the primary stream is available.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In an aspect the invention may relate to a computer-implemented method for enabling synchronization of processing of data units associated with a primary media stream and data units of one or more secondary media streams by at least one media processing device. The processing of said data units may be based on a common content timeline of said primary and said one or more secondary media streams.

Further, the method may comprise the execution of computer readable program code by at least one processor, preferably a microprocessor, in said at least one media processing device, wherein during said execution at least one of the following steps may be performed: selecting a primary media stream that is broadcasted by a broadcast source, said primary media stream being associated with at least one secondary media stream; providing cache timing information associated with a time difference between the processing of at least one data unit of the primary media stream that is associated with a time instance on said common content timeline and the processing at least one data unit of said at least one secondary media stream that is associated with a time instance on said common content timeline that corresponds to the time instance of said at least one data unit of said primary stream; and, receiving one or more cache data units selected by at least one cache server on the basis of said cache timing information, wherein at least part of said cache data units correspond to data units of said primary media stream, which data units, at the time the primary media stream was selected by said media processing device, were already broadcasted by said broadcast source.

In the above method the common timeline correlates the processing of data units of the primary stream with one or more corresponding data unit of the secondary stream. Hence, a time instance on the common content timeline is associated with at least one data unit of the primary stream and at least one data unit of the secondary stream (a corresponding data unit of the secondary stream), so that if the these streams are played-out according to the common timeline synchronized playout is achieved.

Further, the term broadcasting may refer to any suitable point-to-multipoint media distribution technique, including any form of broadcasting, webcasting, multicasting (including application-level or overlay multicasting) and/or anycasting and the term processing may generally refer to any processing step in a media processing device that is needed for transforming a data unit in to a signal for display (including but not limiting to the reception of data units, buffering (de)packetizing, encoding or decoding, encrypting or decrypting and/or playout of the data units).

Hence, the method enables synchronization, in particular instant synchronization, of processing of data units of different media streams, in particular a primary broadcast stream and one or more associated secondary streams. An associated secondary stream may be regarded as a stream that provides additional and/or complementary information to the primary stream when they are rendered in sync. This information may be provided in any form, e.g. subtitles, audio (language synchronization or additional commentary), picture in picture, different viewing angles, close-ups, etc.). Such secondary stream can be generated on the basis of or in response to the primary stream, or, alternatively, the stream is generated at the same time as the primary stream (e.g. a different viewing angle).

When selecting a primary broadcast stream, a cache server transmits data units corresponding to data units of the primary stream (cache data units) to the media processing device so that the user device is able to instantly start the synchronized processing of the cache data units and data units of the secondary stream. This way, problems associated with the delay between the reception and processing of data units of the primary and secondary stream by the media processing device may be eliminated or at least substantially reduced thereby. This way the user experience may be substantially improved.

In an embodiment, receiving said one or more cache data units further may comprise: receiving content timeline information associated with said one or more cache data units, said content timeline information correlating said cache data units to said common content timeline, preferably said content timeline information comprising at least one of: DVB synchronized auxiliary data (SAD) timeline packets, RTP timestamps, presentation timestamps or equivalents thereof. Hence, the content timeline information of the cache data units may be used by the media processing device to relate a cache data unit via the common content timeline to a corresponding data unit of the secondary media stream.

In an embodiment, at least part of the data units of said one or more secondary streams are generated after the availability of data units of said primary stream at the output of the broadcast source, wherein said data units of said primary stream have a time instance on said common content timeline that corresponds said at least part of the data units of said one or more secondary streams. In this embodiment, the secondary stream is generated on the basis of the primary stream thereby causing a delay between the primary and the secondary stream (the secondary stream delay), which can be eliminated or reduced by the transmission of cache data units to the media processing device.

In an embodiment, at least part of said one or more cache data units forming a sync stream originating from said cache server; wherein said method may further comprise: receiving data units of said at least one secondary stream;
processing at least part of one or more cache data units in synchronization with corresponding data units of said received secondary stream. Hence, when the cache data units are received by the media processing device, it can immediately start rendering the cache data units and data units of the secondary stream in sync, despite the fact that a substantial delay may exist between the primary and secondary stream.

In an embodiment, said method may comprise: determining at least part of said cache timing information on the basis of: time information associated with the processing of the first data unit or one of the first data units of said primary and of said at least one secondary stream by said at least one media processing device. In this embodiment, the media processing device may determine part of the cache timing information for the cache server on the basis of the time the first data units of the primary and secondary stream are processed (e.g. received, buffered or decoded) by the media processing device.

In another embodiment, said method may comprise: determining at least part of said cache timing information on the basis of: time information associated with the passage of the first data unit or one of the first data units of said primary and of said secondary stream at one or more proxy servers that are located in the path of said primary and secondary stream. In this embodiment, part of the cache timing information is determined on the basis of the passage time of data units of the primary and secondary stream passing a proxy. A network element, e.g. an instant sync server, may use this information to determine the cache timing information.

In an embodiment, selecting said primary stream may further comprise: receiving program information related to said primary media stream, preferably said program information being embedded in said primary media stream, said program information comprising at least one of: an instant sync indicator for triggering an instant synchronization module in the media processing device to configure said media processing device for receiving said cache data; location information, preferably at least part of an URL, an IP address or an equivalent therefor, for locating said cache server; location information, preferably at least part of an URL or an equivalent therefor, for locating a media source configured for sending data units of said primary stream and/or at least one of said one or more secondary media streams; and/or, location information, preferably at least part of an URL, an IP address, or an equivalent therefor, for locating a media source configured for sending a manifest file associated with said primary media stream; and/or, at least one of said one or more secondary media streams to said at least one media processing device. Hence, at least part of the information needed for enabling synchronization on the basis of cache data units from a cache server may be provided in the broadcast stream to the media processing device.

In an embodiment, said method may comprise: receiving location information, preferably at least part of an URL or an equivalent therefor, for locating said cache server; and, using said location information to send a cache request to said cache server, preferably said cache request comprising said timing information.

In an embodiment, said method may further comprise: said cache server using said cache timing information to select at least one data unit in said cache to start the transmission of said sync stream to said at least one media processing device.

In an embodiment, said common content timeline may correlate data units of said primary media stream and data units of said sync stream with data units of said at least one or more secondary media streams.

In an embodiment said primary media stream and/or said secondary media stream comprise(s) or are(is) associated with content timeline information for establishing a common content timeline between said primary and secondary media stream, preferably said content timeline information comprising at least one of: timeline packets, preferably DVB synchronized auxiliary data (SAD) timeline packets, RTP timestamps, presentation timestamps, content timeline information in a manifest file representing (part of) the primary and/or secondary media stream.

In an embodiment, said cache data units are stored together with said content timeline information in said cache server.

In an embodiment said synchronization is established between at least a primary media processing device for receiving said primary stream and at least one secondary media processing device for receiving said at least one of said one or more secondary media streams, preferably said secondary media processing device being configured as an (HbbTV) companion screen.

In an embodiment, said method may comprise comprising: establishing a communication connection between said first and second media processing device; in response to the selection of said primary media source, instructing said secondary media processing device via said communication connection to request said secondary media stream; said primary media processing device receiving at least part of said one or more cache data units in a sync stream originating from said cache server; and, said primary media processing device instructing said secondary media processing device via said communication connection to start processing data units of the secondary stream that correspond to the one or more cache data units received by said primary media processing device.

In an embodiment said cache server may transmit data units on the basis of a point-to-point data transmission technique, preferably a unicast data transmission technique; and/or, wherein said broadcast source transmits data units on the basis of a point-to-multipoint data transmission technique, preferably including broadcasting, webcasting, anycasting, IP multicasting, application-level multicasting.

In an embodiment said transmission may be started using a random-access data unit that has no processing dependency on one or more data units, preferably said selected data unit being a (MPEG) I-frame or an equivalent thereof.

In a further aspect, the invention may relate to a media processing device for synchronization of processing of data units of a primary media stream and of one or more secondary streams, said media processing device comprising:

In an aspect, the invention may relate to a synchronization module for use in a media processing device or a network node, said module enabling synchronization of processing of data units of a primary media stream and of one or more secondary streams by said media processing device, said module being configured for: receiving data units of a primary media stream and data units of at least one secondary media stream that is associated with said primary stream; providing cache timing information associated with a time difference between the processing of at least one data unit of the primary media stream that is associated with a time instance on said common content timeline and the processing of at least one data unit of said at least one secondary media stream that is associated with a time instance on said common content timeline that corresponds to the time instance of said at least one data unit of said primary stream; and, requesting one or more cache data units from at least one cache server on the basis of said cache timing information, wherein at least part of said cache data units correspond to data units of said primary media stream that, at the time the primary media stream was selected, were already broadcasted by said broadcast source.

In yet another aspect, the invention may relate to a processing device for synchronization of processing of data units of a primary media stream and of one or more secondary streams, wherein said processing may be based on a common content timeline of said primary and said one or more secondary media streams, and wherein said media processing device may comprise comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: selecting a primary media stream that is broadcasted by a broadcast source, said primary media stream being associated with at least one secondary media stream; providing cache timing information associated with a time difference between at least one data unit of the primary media stream that is associated with a time instance on said common content timeline and at least one data unit of said at least one secondary media stream that is associated with a time instance on said common content timeline that corresponds to the time instance of said at least one data unit of said primary stream; and, receiving one or more cache data units selected by at least one cache server on the basis of said cache timing information, wherein at least part of said cache data units correspond to data units of said primary media stream, which data units, at the time the primary media stream was selected by said media processing device, were already broadcasted by said broadcast source.

In a further aspect, the invention may relate to a cache node, preferably a cache server, for enabling synchronization of processing of data units of a primary media stream and of one or more secondary streams by at least one media processing device, preferably a media processing device according as described above, said cache node comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: storing cache data units, said cache data units being copies of data units of said primary media stream that are broadcasted by a broadcast source; storing content timeline information associated with said primary media stream, said content timeline information providing a common content timeline between said primary and secondary media stream in a memory of said cache node; receiving a cache request from a media processing device, said cache request being generated in response to the media processing device selecting said primary media stream; and, selecting one or more cache data units on the basis of cache timing information in said cache request.

In an embodiment, said cache timing information may be associated with a time difference between the processing by said media processing device of at least one data unit of the primary media stream that is associated with a time instance on said common content timeline and the processing of at least one data unit of said at least one secondary media stream that is associated with a time instance on said common content timeline that corresponds to the time instance of said at least one data unit of said primary stream, wherein at least part of said selected cache data units correspond to data units of said primary media stream that, at the time the primary media stream was selected, were already broadcasted by said broadcast source.

In another aspect the invention may relate to a non-transitory computer-readable storage media for storing In another aspect the invention may relate to a data structure, said data structure configured for enabling instant synchronization of processing of data units of a primary media stream and of one or more secondary streams by a media processing device, said data structure comprising computer readable program code comprising at least one of: an instant sync indicator configured for triggering a sync module in the media processing device to configure said media processing device for receiving cache data from a cache server, preferably said cache data comprising cache data units, said cache data units being copies of data units of said primary media stream that are broadcasted by a broadcast source; location information, preferably at least part of an URL, an IP address or an equivalent therefor, for enabling said media processing device to locate said cache server; location information, preferably at least part of an URL, an IP address or an equivalent therefor, for enabling said media processing device to locate a media source configured for sending data units of said primary stream and/or at least one of said one or more secondary media streams to said at least one media processing device; and/or, location information, preferably at least part of an URL or an equivalent therefor, for enabling said media processing device to locate a media source that is configured for sending a manifest file associated with said primary media stream; and/or, at least one of said one or more secondary media streams to said at least one media processing device.

In embodiments of the invention said data structure is a manifest file, preferably a MPEG DASH manifest file.

In another aspect the invention may relate to a non-transitory computer-readable storage media for storing a data structure according to the invention, or a data signal configured for carrying a data structure according to the invention to a media processing device.

The invention may also relate to a computer program product comprising software code portions configured for, when run in the memory of a computer, executing the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 8 depicts manifest files according to various embodiments of the invention.

FIG. 9 depicts an AIT table according to an embodiment of the invention.

DETAILED DESCRIPTION

Figure 1:
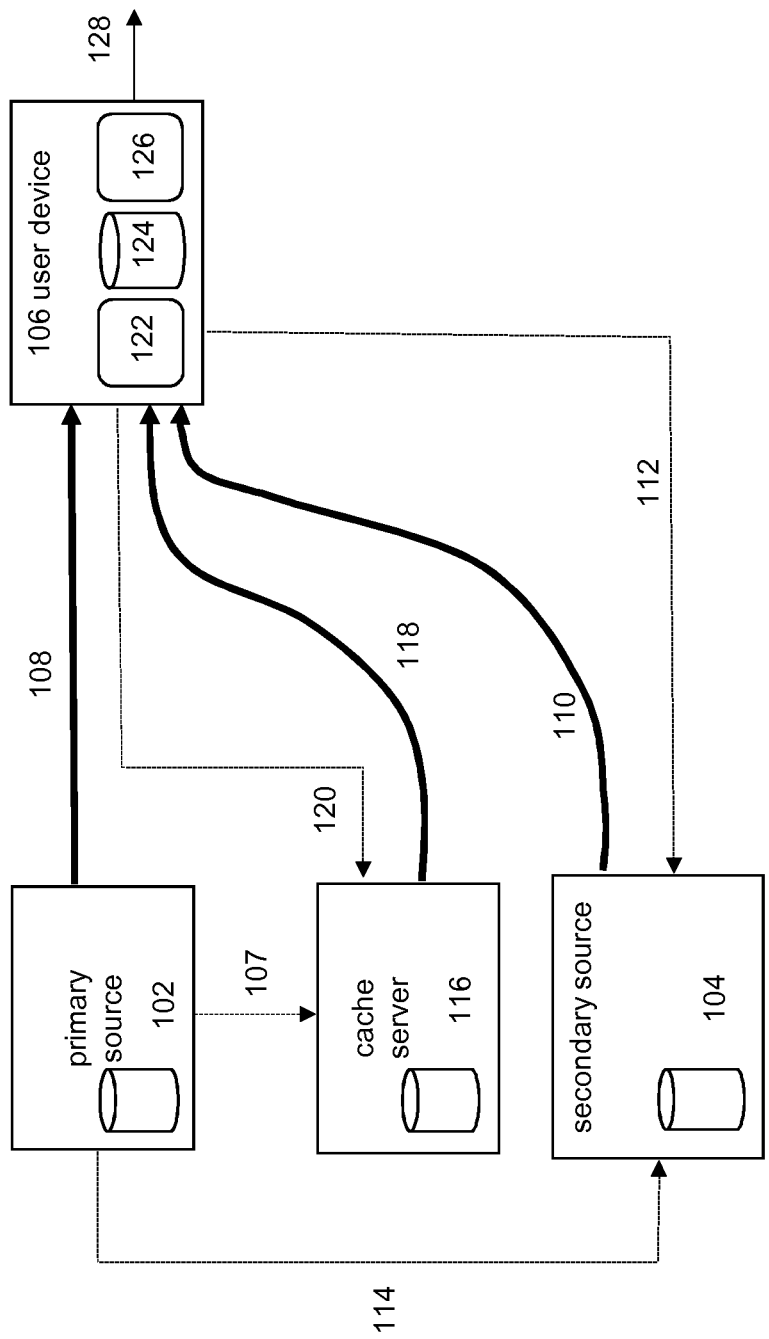
FIG. 1 depicts a system for synchronizing the processing of a primary and a secondary stream according to an embodiment of the invention.

FIG. 1 depicts a system for synchronizing the processing of a primary and one or more secondary streams by a media processing device according to an embodiment of the invention. In particular, FIG. 1 depicts a system for synchronizing the processing of data units of a primary and a secondary stream that are transmitted by a primary media source 102 and a secondary media source 104 respectively to one ore more media processing devices 106. The secondary stream may be associated with the primary stream and convey additional information, e.g. foreign language subtitling, an additional audio stream, or an interactive "event" stream, to provide added value to the primary video stream. Further, the secondary stream may be transmitted independently from the primary stream, possibly on the basis of a different access technology than the primary stream.

The primary stream may be associated or linked to one or more secondary streams that are generated on the basis of or in response to the primary steam. In particular, at least part of a secondary stream may be generated on the basis of data units of the primary stream once one or more data units are made available at the output of the primary source. For example, the a secondary steam may relate to a subtitle steam, a sign language stream, an audio translation or an audio steam that is generated during the broadcast of the primary stream by a third party. A service associated with one or more secondary streams may be offered as an over-the-top (OTT) service to the media processing device. If the media processing device has access to such service, the media processing device may be provided with information, program information, for selecting a secondary stream that is associated with the primary stream. For example, the media processing device may be provided with or may have access to an electronic programming guide or an equivalent data structure which is configured to link or correlate a particular (primary) broadcast service to one or more IP-based (secondary) broadband services.

In order to provide a scalable media distribution scheme, the primary media source may packetize content in data units and transmit data units to the media processing devices using a suitable broadcasting technique. The term broadcasting may include any suitable point-to-multipoint media distribution technique, including any form of broadcasting, webcasting, multicasting (including application-level or overlay multicasting) and/or anycasting. Transmission of the primary stream to the media processing device may be implemented on the basis of one or more transport and/or streaming protocols that are suitable for broadcasting applications, e.g. MPEG-2, MPEG-4, RTP, DVB and (HTTP) adaptive streaming protocols such as HLS or MPEG-DASH or other suitable or equivalent protocols. Transmission of the secondary stream may implemented on the basis of a point-to-point streaming protocol such as an (IP-based) broadband streaming protocol, including adaptive streaming protocols such as HLS or MPEG-DASH or alternatively on the basis of a point-to-multipoint media distribution technique as described above.

In order to process the data units of the primary stream, a media processing device may comprise a suitable broadcast and/or broadband processor, wherein a data unit may represent a data container comprising content payload, e.g. (part of) one or more video frames and/or audio samples, and a header. In some embodiments, a data unit may also represent a segment, chuck or a part thereof. The format of a data unit may depend on the protocol(s) that is (are) used for transmitting the data units to the to the media processing devices.

The primary and secondary media sources may be implemented as one or more media servers. In an embodiment, the one or more media servers may be part of media distribution system, e.g. IPTV system, a DVB head-end, or one or more content distribution networks (CDN). Similarly, a media processing device may generally relate to a content processing device, e.g. a (mobile) content playout device such as an electronic tablet, a smart-phone, a notebook, a media player, etc. In some embodiments, a media processing device may be a set-top box or content storage device configured for processing and temporarily storing content for further consumption by a content playout device. Here, the term processing may generally refer to any processing step in the media processing device that is needed for transforming a data unit in to a signal for display (including but not limiting to receiving, buffering (de)packetizing, encoding or decoding, encrypting or decrypting and/or playout of the data units).

The media processing device may be configured to select a primary stream, e.g. a (live) stream, associated with a video streaming service from the primary content source and buffer the data units of a primary stream 108. The buffered data units may be processed in order to playout 128 the payload of the data units on a display. The selection of the primary stream may trigger the media processing device to receive a secondary stream 110 from the secondary media source.

In an embodiment, the selection may trigger the media processing device to send a media request 112 to a secondary content source associated with the requested service. Alternatively, in another embodiment, the primary stream may be associated with a (default) secondary stream so that when the primary stream is selected by the user of the media processing device, the secondary stream may be automatically sent (pushed) to the media processing device.

The primary stream may be requested on the basis of any type of stream selection technique. For example, a (primary) broadcast stream may be selected by joining a multicast session or tuning into a (modulated) DVB stream. Similarly, the secondary stream may be requested (112) on the basis of a (secondary) broadband request. In an embodiment, the stream request may comprise requesting a (IP-based) broadband stream using an HTTP or RTSP request. In yet another embodiment, instead of a request originating from the media processing device, a network element may request (initiate or "push") transmission of a stream to the media processing device.

Data units in a stream may be associated with meta-data that is used by the media processing devices to process the data units (e.g. a video frame and/or audio sample) in the correct time order. The meta-data may be inserted in the header of a data unit or in dedicated data units in the stream. Alternatively and/or in addition, meta-data associated with the stream may be transmitted in a separate stream or file to a media processing device. The meta-data may comprise a sequence of linearly increasing (unique) values, which may be used to identify a data unit (a data unit identifier) and to identify the order in which data units are processed by a receiver in time.

The data units (which may be identified by data unit identifiers) that are processed in a predetermined time order may form a content timeline. The content timeline thus represents the processing of a predetermined sequence of data units on a timeline. In case the processing of a data unit refers to playout (presentation) of a data unit, the content timeline may be referred to as the content presentation timeline. Data units may be linked to a time instance on the content timeline using content timeline information, e.g. a timestamp value or the like. In an embodiment, the content timeline may refer to an MPEG metadata content timeline based on Presentation Timestamps (PTS) and/or Decoding Timestamps (DTS) or a broadcast timeline as referred to in ETSI TS 102 823. Alternative timelines that may be used are an ISOBMFF CT (Composition Time) based timeline; a TSAP (Transport Stream Adaptation Private data) based timeline; a MPEG TEMI (Timed External Media Information) based timeline, or a MPEG DASH (Period relative Timeline) based timeline.

Similarly, information that is used to establish a content timeline may include: RTP timestamps associated with (part of) a frame, data, and/or audio sample, presentation timestamps used in MPEG2-TS format, a play-back position (e.g. SMPTE time code or normal play time) used in Real Time Streaming Protocol (RTSP, see IETF RFC 2326), content timeline information in the manifest file or one or more equivalent protocol parameters in or associated with data units in the stream. This information may be referred to as content timeline information.

As the secondary stream is configured for playout in sync with the primary stream, both streams have a common content timeline. A common timeline correlates the processing of data units of the primary stream with one or more corresponding data unit of the secondary stream. Hence, a time instance on the common content timeline is associated with at least one data unit of the primary stream and at least one data unit of the secondary stream (a corresponding data unit of the secondary stream), so that if the these streams are played-out according to the common timeline synchronized playout is achieved.

Broadcast streams, such as a DVB broadcast stream, typically use MPEG-TS to carry payload. Such streams may use the MPEG-TS PCR/PTS system as content timeline information. The presentation timestamp (PTS) values however are not well suited for synchronization across different media delivery methods due to the fact that PCR/PTS values may change whenever the MPEG-TS is (re-)multiplexed in the network. For that reason, in an embodiment, timeline packets, such as the DVB Synchronised Auxiliary Data (SAD) data packets in a DVB MPEG-TS stream, may be used as content timeline information. The SAD data may be used to add timeline packets to the MPEG-TS stream. These timeline packets allow the inclusion of an absolute timeline in the stream. The time may start at 00:00:00 in hh:mm:ss and increase monotonously with the playout of the content in time. This way, the timeline carried in the timeline packets, e.g. time-configured SAD packets, may be therefore well suited for providing a common timeline between the primary stream and secondary stream, e.g. an MPEG-DASH stream, that may use an absolute time in the MPD as a basis for the playout of chunks.

In the system of FIG. 1 there is an (intrinsic) time difference present between access by the media processing device to data units of the primary stream and corresponding data units of the secondary stream. This time difference may cause a delay Δ—which hereafter may be referred to as the secondary stream delay—between the processing of data units of the primary stream and corresponding data units of the secondary stream. The delay would require the media processing device to wait for the arrival of delayed corresponding data units of the secondary stream in order to achieve synchronized playout of both streams. This delay may have different origins. For example, in an embodiment, the secondary stream may be created on the basis of or in response to data units that are made available by the primary stream. Alternatively and/or in addition, the IP network or the CDN that is used for transmission of the second stream to the media processing device may be relatively slow compared to the network, e.g. a DVB network, that is used for transmission of the primary stream to the media processing device.

Hence, depending on the situation, mechanisms that may contribute to the secondary stream delay may include the time needed for: the transmission of the broadcasted data of the primary stream to the secondary source, the processing of the primary stream that is needed for generating a secondary stream, the signaling time for setting up a connection between secondary media source and a media processing device and the transmission of the secondary stream to the media processing device via one or more networks.

In order to eliminate or at least reduce the detrimental effects in the user experience due to this delay, the system further comprises a cache server 116 that is configured to temporarily store (cache) a copy of at least part of the data units that are broadcasted by the primary source. The data units may be stored (cached) in a memory together with timeline information, which may be used by the cache server to link a data unit to a time instance on the common content time line. For example, in case of an MPEG-TS based primary stream, the cache data units may be stored along with their PCR, PTS and/or SAD values. In an embodiment, the cache server may comprise a broadcast interface to receive and cache data units 107 that are broadcasted by the primary source. In another embodiment, the cache server may be provided with copies of data units of the primary stream via another content source. The cache server may be implemented as one or more (stand-alone) servers or a network of servers or may be integrated in or co-located with the primary or secondary media source.

When a user selects a broadcast service (a primary stream) that is associated with one or more secondary streams, the cache server may be activated to select one or more cache data units and transmit one or more cache data units associated with the primary stream to the media processing device of the user that selected that broadcast service. The cache data units and the content timeline information associated with the selected cache data units may then be transmitted to the media processing device.

When the media processing device receives the cache data units and the associated content timeline information, it may use the content timeline information to correlate a cache data unit with a data unit of the primary stream. For example, it may use the absolute time in a SAD packet to determine its time instance on the common content timeline and use that time instance to find a corresponding data unit of the secondary stream in the buffer of the media processing device. As the cache data units correspond to data units of the primary stream that were already broadcasted by the broadcast source when the user selected the primary stream, the media processing device can instantly start processing, e.g. playout, data units associated with the primary and secondary stream in a synchronized way. The synchronization of the processing of data units of in a primary and a (delayed) secondary stream that is supported by the cache server as described in this application may be referred to as instant second stream synchronization or—in short—instant synchronization.

In an embodiment, the cache server may send a predetermined set of cache data units in a sync stream 118 (e.g. a set of data units that are transmitted at a rate faster than real-time) to the media processing device when the user selects a service that is supported by one or more secondary streams (e.g. a primary stream representing a live TV program and one or more secondary streams representing one or more subtitles or language synchronization services). In another embodiment, the cache server may transmit the cache data units in a burst, i.e. at a rate faster than real-time, to the media processing device when the user selects a service that is supported by one or more secondary streams The sync stream may be sent in a point-to-point (e.g. unicast) data transmission to the media processing device. Preferably, the sync stream may be transmitted over a low-delay channel to the media processing device. Here, a low-delay communication channel may be defined as a communication channel between a transmitter and a receiver that has a transmission time, which is substantially smaller than the delay between the primary and secondary stream. For example, when the secondary stream delay Δ is in the order of 2 to 5 seconds, a communication channel of a transmission time of less than 500 milliseconds may be sufficient.

The sync stream may provide the media processing device with data units of the primary stream that were already transmitted when the media processing device selected the primary stream so that the time before the media processing device can playout the primary and secondary streams in sync is substantially reduced.

In order to enable the cache server to provide the media processing device with a selection of cached data units, the cache server may be configured to receive a cache request 120 from an instant synchronization (sync) module 122. The instant sync module may be implemented in the media processing device. In another embodiment, at least part of the functionality of the instant sync module may be implemented in a network element, e.g. a server. An example of such embodiment will be discussed in more detail with reference to FIG. 10.

In an embodiment, the instant sync module may determine or may be provided with cache timing information associated data units of the primary and secondary stream and send a cache request comprising the cache timing information to the cache server. The cache server may use the cache timing information to determine a data unit in the cache for starting the transmission of the sync stream, i.e. a linear sequence of data units on the common content timeline of the primary and secondary stream.

In an embodiment, the cache timing information in the cache request may comprise a start time indicator. The start time indicator may be a reference to a time instance (e.g. a timestamp or the like) on the common content timeline of the primary and secondary stream that may be used to identify a data unit in the cache. Alternatively, the cache timing information may comprise another type of identifier to identify a particular data unit, such as a frame number or an audio sample number. This data unit may be used by the cache server as the first or one of the first data units in the sync stream that is transmitted to the media processing device.

In an embodiment, the data unit selected from the cache may be a random-access data unit (e.g. an I-frame) that can be immediately decoded by the media engine in the media processing device. Further, in an embodiment, the time information in the cache request may comprise a stop time indicator. The stop time indicator may include or may be linked to a time value on the common content timeline that may be matched with a data unit in the cache. This data unit may be used by the cache server as the last data unit in the sync stream that is transmitted to the media processing device.

Data units of the primary, secondary and the sync stream will be stored in a buffer 124 of the media processing device and processed by a media engine 126 wherein the data units in the sync stream (the cache data units) may be used to render the content of the primary and secondary stream in sync without the time lag and/or frame freeze problems.

Figure 2:
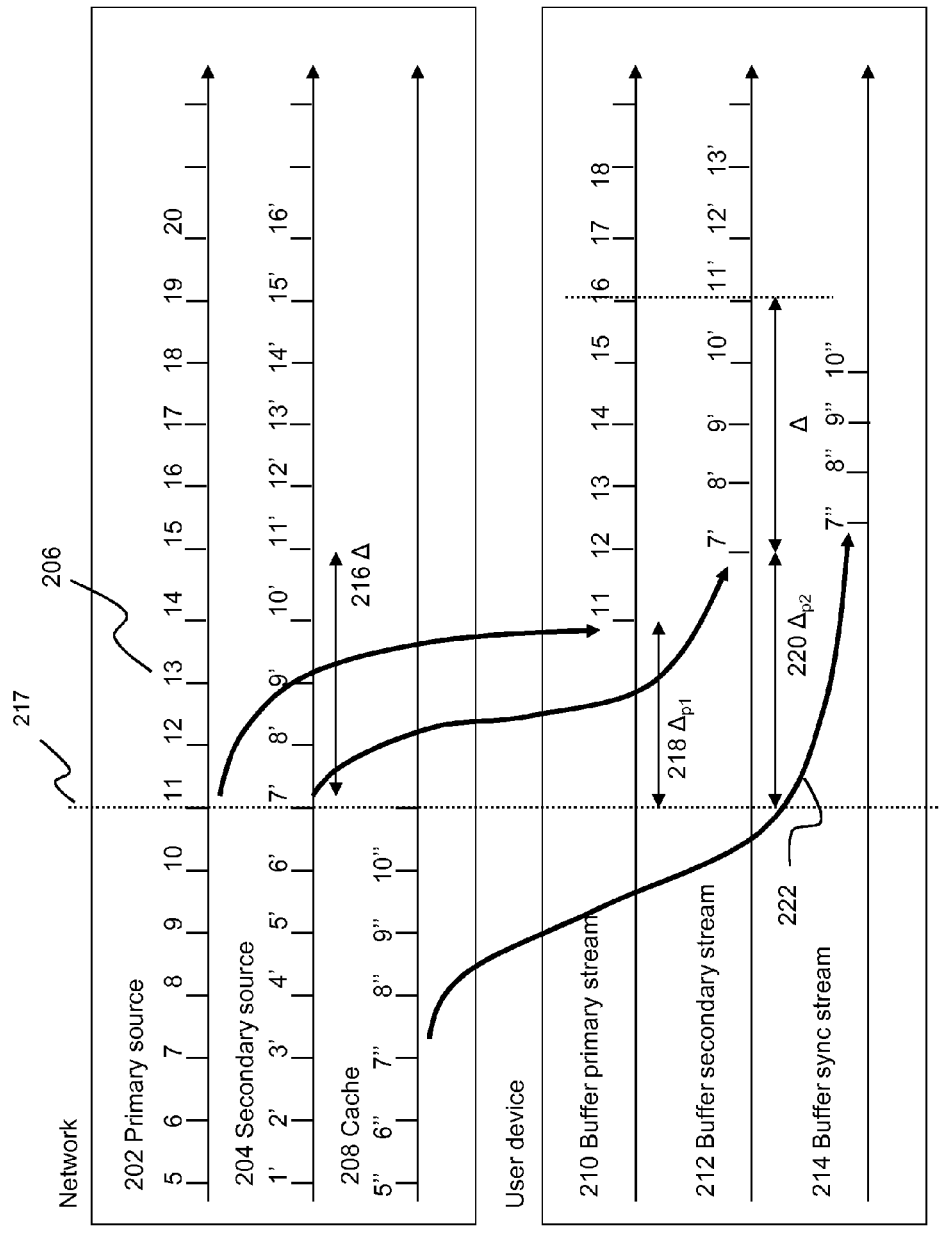
FIG. 2 depicts schematics of the timelines the synchronization process according to an embodiment of the invention.

FIG. 2 depicts a schematic of the timelines of different streams that are transmitted, received and processed in system as described with reference to FIG. 1. In particular, FIG. 2 depicts the timelines 202,204 of the transmission of data units 206 at a certain rate by the primary and secondary source respectively and the reception of the transmitted data units by the cache server 208 and the buffer 210,212,214 of the media processing device. The buffer may comprise a primary source buffer 210, a secondary source buffer 212 and a sync stream buffer 214. In an embodiment, a low-delay communication channel exists between the primary source and the cache server so that the delays associated with the transmission of data units from the primary source to the cache are very small compared to the other delays that present in the system. In another embodiment, the cache may be provided with copies of data units from the primary stream by another source. This way, the cache may comprise copies of data units (cache data units) that have been broadcasted by the primary source, in this particular example data units 5-10. This way, the cache stores at least a set of data units that has been broadcasted by the primary stream. The data units are stored in the cache such that the common content timeline is maintained.

From FIG. 2 it follows that that moment the primary stream is selected by the media processing device at the current time (dashed line 217), data unit 11 of the primary stream is available at the output of the primary source, while its corresponding data unit 11' of the secondary stream will only be available at the output of the secondary source after a time delay Δ 216. This delay Δ represents the so-called secondary stream delay as described above.

FIG. 2 further shows that at the current time 216 no data units have been received by the media processing device. When transmitting data units to the media processing device, an end-to-end delay causes a time-interval between the start of transmission of the data units by the media source and the actual processing of these data units by the first receiver. This end-to-end delay (also referred to as the playout delay) may be the result of different types of delays, including network delays caused by delay sources in the network (e.g. unexpected jitter, congestion, packet-loss, delays induced by the use of a CDN) and by delays caused by the processing of the data units by the receiver (e.g. buffering, depacketizing, decrypting and/or decoding data units by a media engine in a receiver). Hence, when time evolves (i.e. the dashed line moves to the right), the media processing device may start receiving data units, in this particular example a first data packet (data packet 11) of the selected primary stream at a time $\Delta_{p1}$ 218 after the stream selection and a first data packet (data packet 7') of the secondary stream at a time $\Delta_{p2}$ 220 after the stream selection wherein $\Delta_{p1}$ and $\Delta_{p2}$ are the playout delays of the primary and the secondary stream respectively.

In an embodiment, the instant sync module in the media processing device may use time information associated with received data units of the primary and secondary stream in order to compose a cache request comprising at least one start time indicator. For example, in the example of FIG. 2, the instant sync module may use time information associated with the first or one of the first received data units of the secondary stream (in this case data unit 7') to select a corresponding cache data unit 7" from the cache that will be used by the cache server as the first or one of the first data units of a set of cache data units (data units 7"-10") that are transmitted in a sync stream 222 (or a sync burst) to the media processing device.

In a further embodiment, the instant sync module may use time information associated with received data units of the primary stream in order determine a stop time indicator. In case the cache request does not comprise a stop time indicator, the media processing device may be configured to send a signal to the cache server to stop transmission.

Figure 3:
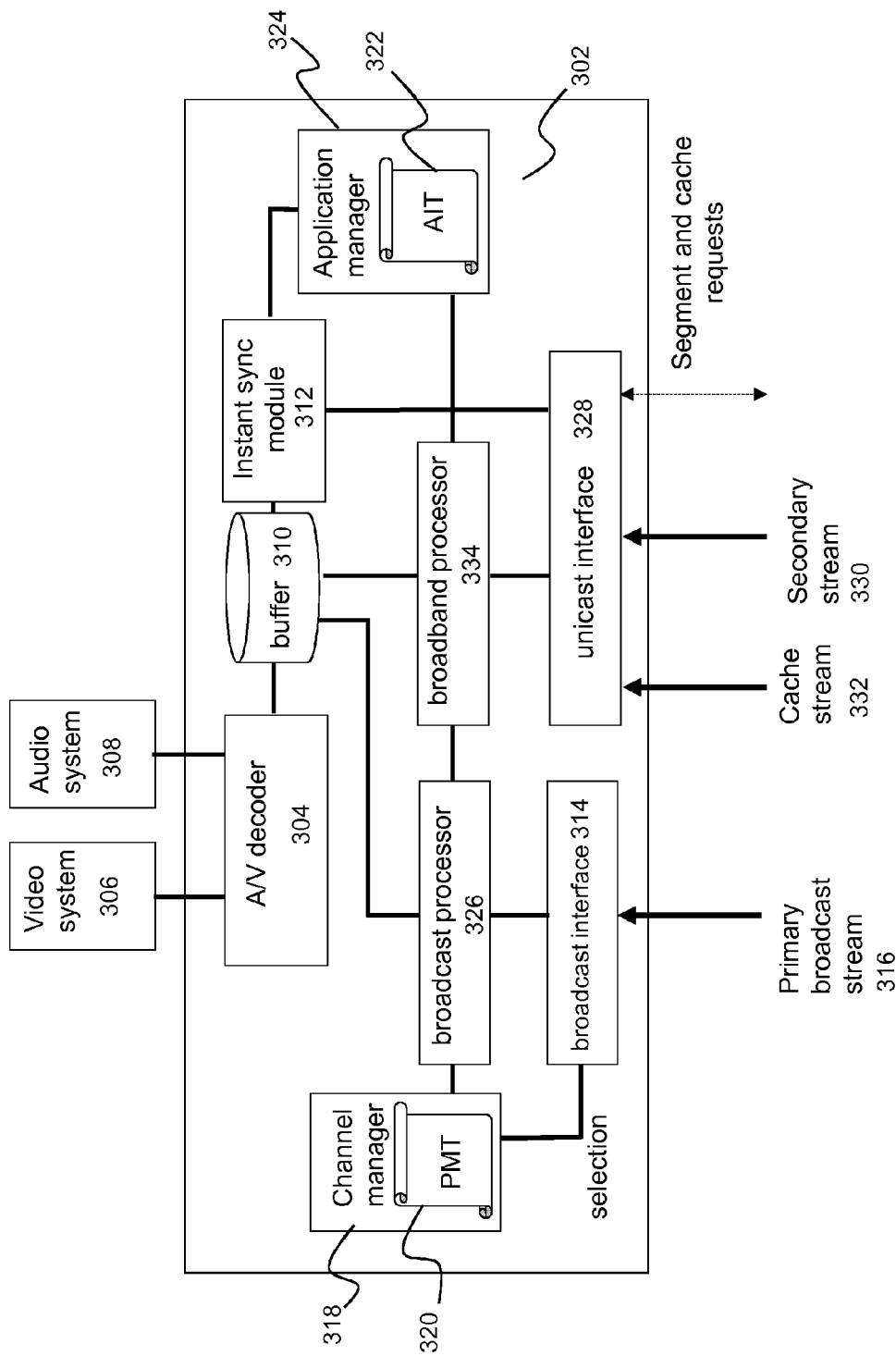
FIG. 3 depicts a device configured for synchronizing the processing of a primary and a secondary stream according to an embodiment of the invention.

FIG. 3 depicts a media processing device configured for synchronizing the processing of a primary stream and one or more secondary streams according to an embodiment of the invention. In particular, FIG. 3 depicts a media processing device 302 that is configured for receiving and processing (primary) broadcast services that may be enhanced with one or more (secondary) OTT services that are supplied to the media processing device on the basis of one or more IP-based unicast streams. The media processing device may comprise an audio/video decoder 304 for decoding audio and video packets and for transmitting the decoded packets to a video system 306 and audio system for display 308 for playout. Broadcast streams may be received via a suitable broadcast interface 314, e.g. a DVB tuner that is configured to receive a modulated DVB broadcast signal or an IP or application-level multicast API that is configured to join a multicast group. A broadcast processor 326 may process, e.g. demultiplex and depacketize, the received broadcast stream and forward the video and audio packets to the buffer.

During the processing of the broadcast stream, the broadcast processor may extract program or video metadata information, which is sent to a channel manager 318 or an application manager 324. For example, in case of an MPEG-TS-type broadcast stream, the channel manager may be configured for receiving program specific information (PSI), i.e. metadata about a program broadcast. The program specific information may include a Program Map Table (PMT) 320 that identifies and indicates the locations of the streams that make up a service. A PMT may describe the (packetized) elementary streams defining a program wherein each (packetized) elementary stream is characterized by a PID, i.e. Packet Identifier (PID) values of the Transport Stream (TS) packets. There may be a PMT for each service in the transport stream of the broadcast.

Program specific information (PSI) may further comprise a data structure, e.g. application information table (AIT), 322 that may be forwarded to an application manager 324. The AIT may comprise one or more pointers, e.g. URLs, that point to a media server that supports interactive media services such as HbbTV and the DVB multimedia home platform (MHP). Similarly, (IP-based) streams such as the sync stream 332 and/or the one or more secondary streams 330 and signaling messages may be received via a suitable network interface 328. A broadband processor 334 may subsequently process, e.g. demultiplex and/or depacketize, the received data units of the unicast stream and send the audio and/or video packets to the buffer.

In case the primary and/or secondary stream is a segmented stream, e.g. a time-segmented video stream such as an MPEG DASH stream and/or a spatially segmented stream such used in tiled video streaming as e.g. described in WO2012/168365, the broadcast and/or unicast interface may include at least one adaptive streaming client that is configured to request segments on the basis of a manifest file.

In an embodiment, the secondary media source may be configured to transmit multiple instances of a secondary media stream to a media processing device. Different instances of the media stream may refer to different video qualities (SD, HD, etc.), different codecs (H.264, HEVC, VP8, VP9, etc.) and/or different transport protocols (DVB, MPEG-DASH, RTP, etc.). In an embodiment, the primary stream and/or secondary stream may comprise instant sync metadata for enabling enhancement of secondary stream or secondary screen services with instant synchronization functionality using a cache server as described in this specification. The instant sync metadata may notify an instant sync module 312 in the media processing device that instant synchronization of the primary and secondary stream is supported and to configure the media processing device for reception and processing of data units from a sync stream.

For example, the instant sync metadata may include an instant sync indicator, e.g. a flag, indicating a cache server that stores data units associated with the primary stream. The instant sync indicator may function as a flag merely indicating availability of the sync service, whereby the location of the cache server may have been already available for use at (e.g. stored in memory) at the media processing device. Alternatively the instant sync metadata may include a locator for locating the cache server. The instant sync indicator may trigger the instant sync module in the media processing device to configure the network interface for receiving a sync stream from a cache server. Further, the instant sync module may configure the buffer to receive and process data units of the primary and secondary stream as well as data units of the sync stream and content timeline information associated with data units of the sync stream.

In an embodiment, the instant sync metadata, preferably sent as part of the primary broadcast stream to the media processing device, may comprise location information of the cache server, e.g. an URL, IP address or equivalences thereof, pointing to the location of the cache server so that it may sent messages, e.g. a cache request, to the cache server. The instant sync metadata may further comprise a value for the secondary stream delay $\Delta$. If the primary broadcast stream is based on 'live' (pushed) segmented streaming, such as a broadcasted MPEG DASH stream, the instant sync metadata may be contained in the manifest file (data structure), whereas the manifest file data structure also contains the chunk (e.g. segment) identifiers for requesting the primary stream.

In a further embodiment, the instant sync module in the media processing device may determine or estimate a value for the secondary stream delay $\Delta$ or information that can be used by the cache server to determine or estimate the secondary stream delay $\Delta$. For example, in an embodiment the secondary stream delay $\Delta$ may be determined or estimated by the media processing device or the cache server on the basis of timing information (e.g. reception or buffering time) of data units that are directly received from the primary and secondary media source. The timing information or secondary stream delay $\Delta$ be sent in a cache request to the cache server.

In some embodiments, e.g. in case of an MPEG-TS-based primary stream, all or at least part of the metadata associated with the cache server may be included in the AIT or another suitable data structure. In further embodiments all or at least part of the metadata according to the invention may be included in an EPG. In another embodiment, all or at least part of the metadata associated with the cache server may be included in a manifest file, e.g. an MPD used with MPEG-DASH. In that case, the primary broadcast stream may comprise location information, e.g. an URL, that points to a location where the manifest file may be retrieved. Alternatively the manifest file (MF, MPD) including the metadata may be transported inside the primary broadcast stream, for example encoded inside an AIT table. The technical benefit may be to save one roundtrip time for retrieving segments, and thus starting the sync stream faster. Normally, two roundtrips are needed, one to retrieve the MF, and another one for the first segment. With the MF included in the primary broadcast stream, only one roundtrip is needed to retrieve the first segment. In other embodiments, the manifest file may have been delivered upfront or during the broadcast of the particular program (even when the user is at that moment watching another broadcast channel), possibly as part of a subscription to a third party service. The manifest file may be regularly updated, so that if the user 'zaps' to a broadcast channel for which at least one secondary stream is made available, the relevant metadata for requesting the sync stream, and the relevant segment identifiers may be already available at the client (user device).

In an embodiment, the segments may be delivered (upon a channel change), using an HTTP 2.0 push mechanism. The technical benefit may be that there is no delay involved for requesting a segment. The user may have indicated advanced interest in such a service (such as via a subscription).

In an embodiment the MF may further include Material Information according to section 5.5 of "Digital Video Broadcasting (DVB); Companion Screens and Streams; Part 2: Content Identification and Media Synchronisation, DVB Document A167-2, July 2014". By including this in the MF, the cache server doubles as Material Resolution Service. The Material Information includes timeline mapping information, such as correlation timestamps. This timeline mapping information may be used to correlate the timelines of the primary broadcast stream and the sync stream to each other. The technical benefit may be that the synchronisation with secondary steam may be achieved faster, as compared to embodiments wherein the Material Information is to be received separately (e.g. requiring a separate roundtrip.)

In further embodiments, at least part of the metadata may be transmitted to the media processing device in an out-of-band signaling path.

The instant sync module 312 may use the metadata to configure the buffer for buffering data units form the primary stream, the sync stream and one or more secondary streams. A synchronization function (not shown) in the instant sync module may use the content timeline information of data units of the sync stream (e.g. PCR, PTS and/or SAD values in case of a MPEG-TS type) in order to correlate data units of sync stream with corresponding data units of the secondary stream in order to achieve fast or even instant synchronization of the processing of (cached) data units of the primary and secondary stream.

It is submitted that at least part of the functional elements in the media processing device may be integrated in one functional module. For example, if both the broadcast and unicast stream relate to a segmented audio and/or video stream, e.g. an MPEG-DASH stream, the broadcast processor and broadband processor may be implemented as one MPEG-DASH client that is configured to process segments from the primary broadcast stream and the secondary unicast stream.

Figure 4:
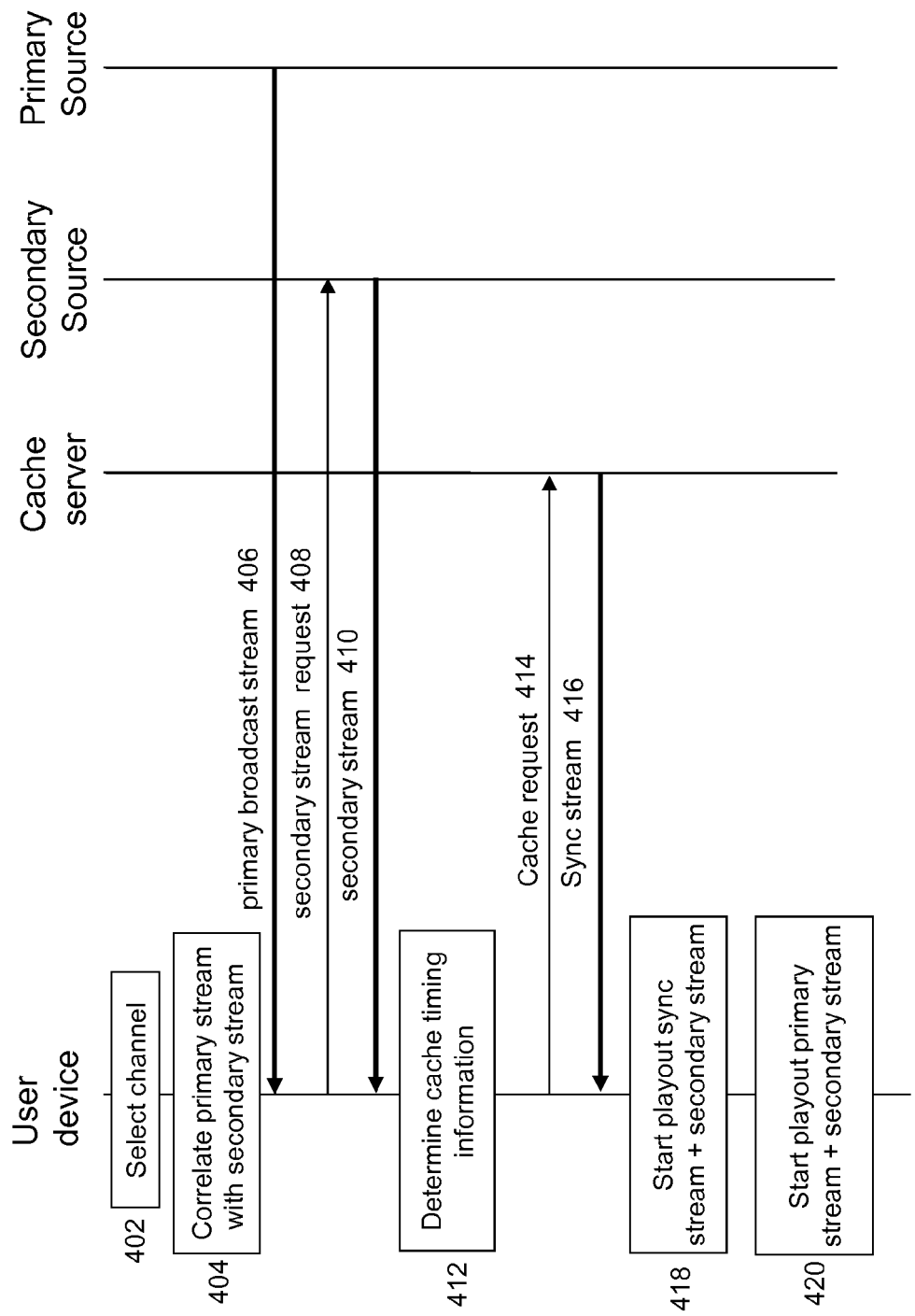
FIG. 4 depicts a flow diagram of a method for synchronizing the processing of a primary and a secondary stream according to an embodiment of the invention.

FIG. 4 depicts a flow of a method for synchronizing the processing of a primary and one or more secondary streams according to various embodiments of the invention. The method may be executed in a system as described with reference to FIG. 1. The process may start with the selection of a broadcast channel (step 402). For example, a user may use the media processing device to select a (live) broadcast on the basis of program or video information (e.g. program specific information) that is presented in a suitable format to the user via a graphical user interface, e.g. a TV, an electronic tablet or a smartphone.

The selected broadcast may be correlated with program specific information about the one or more secondary streams that are available for the selected broadcast (step 404). For example, the program specific information may comprise an AIT comprising location information, e.g. an URL, of a secondary media source that is configured to deliver the requested secondary stream. In another embodiment, the URL may point to a location of a server that is configured to provide a manifest file, e.g. an MPEG-DASH MPD, which enables the media processing device to request the chunks of a segmented video stream from one or more media servers of a CDN.

The media processing device may thereafter start receiving data units of the broadcast stream (step 406). Upon selection of the channel, the media processing device may request the secondary media source transmission of a secondary stream (step 408). Alternatively, a secondary stream may be pushed to the media processing device without the need for a request message from the media processing device. Thereafter the media processing device may also start receiving data units of the secondary stream (step 410), which are delayed with respect to the primary stream.

On the basis of the first received data unit of the primary and secondary stream, the media processing device may determine cache timing information (step 412) for the cache server. The cache timing information may comprise an (estimated) time difference between the receipt of a data unit of the primary media stream that is associated with a time instance on said common content timeline and the receipt of a data unit of said secondary media stream that is associated with the time instance of said data unit of said primary stream.

This time difference may determine the second stream delay $\Delta$ as described above with reference to FIG. 2. In an embodiment, the cache timing information may further comprise a channel selection time, e.g. a time stamp representing a time instance on the common content timeline associated with the user selecting the broadcast channel. The cache timing information may be sent to the cache server (step 414), which may use the cache timing information to select a data unit from the cache for starting the transmission of the sync stream to the media processing device. In an embodiment, the cache timing information may be sent in the cache request to the cache server.

As already described with reference to FIG. 2, the cache server may select one or more data units in the cache (cache data units) that correspond to one or more data units of the primary stream that were already broadcasted when the primary stream was selected and that are related to one or more data units of the secondary stream that were not yet received by the media processing device when the primary stream was selected. When transmitting one or more cache data units in a sync stream to the media processing device (step 416), the media processing device can instantly start processing data from the secondary stream and the cache data units associated with the primary stream in sync (step 418).

At some point during the synchronized processing of the data units, a data unit of the secondary stream is going to be processed that has a corresponding data unit of the primary stream that coincides with the first data unit in the buffer that was sent directly from the primary source to the media processing device. At that point, the processing of the data units may switch to processing data units of the primary source that are received directly from the primary source (step 420). At that point, the transmission of the sync stream may be terminated.

FIG. 4 depicts an embodiment wherein the media processing device determines the cache timing information on the basis of data units from the primary and secondary source. Other schemes for retrieving the cache stream are also possible. For example, in an embodiment the cache timing information, in particular the second stream delay, may be preconfigured in the media processing device or predetermined by the network. For example, the cache timing information may be sent in the selected broadcast or provided to the media processing device in a separate out-of-band channel to the media processing device. In that case the media processing device does not need to wait for the reception of data units from the second stream and can send out the cache request to the cache server as soon as the broadcast channel is selected.

Further, in case the secondary source and the cache server are collocated, the media processing device may request the secondary stream and the sync stream at (substantially) the same time, e.g. in one request comprising timing information for the cache server.

In another embodiment, the cache server may send the sync stream to the media processing device on the basis of a data rate faster than real-time (e.g. fast than the rendering speed of the user device). This may further decrease the time that is needed before the media processing device is able to process data units of the sync stream in sync with data units of the second stream.

Figure 5:
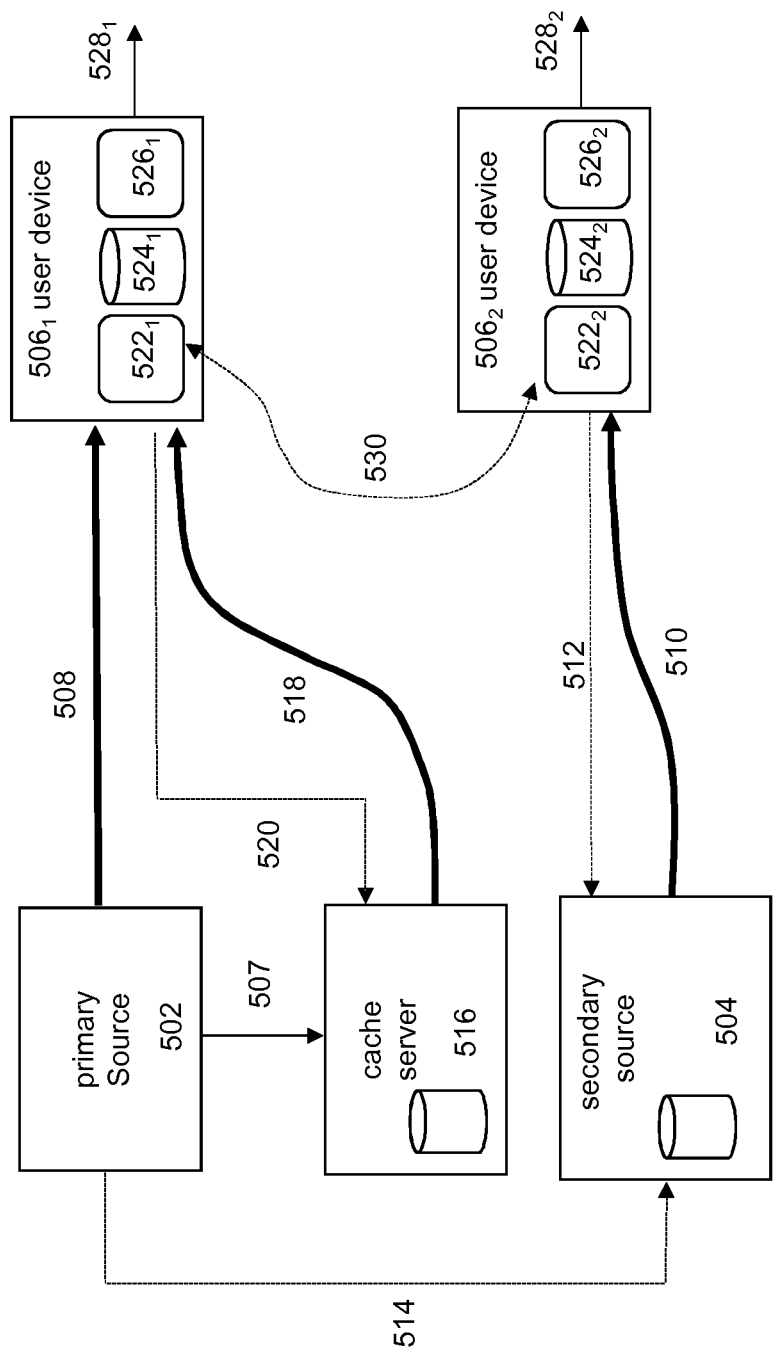
FIG. 5 depicts a system for synchronizing the processing of a primary and a secondary stream according to another embodiment of the invention.

It is submitted that the sequence of steps in FIG. 4 should not be interpreted as limiting and—depending on the implementation—may be altered and/or interchanged without departing the essence of the invention. FIG. 5 depicts a system for synchronizing the processing of a primary and one or more secondary streams by a plurality of media processing devices according to an embodiment of the invention. In particular, FIG. 5 depicts a system for synchronizing the processing of data units of a primary stream 508 and a secondary stream 510 that are transmitted by a primary media source 502 and a secondary media source 504 to a first and second media processing device $506_{1,2}$ respectively that comprise an instant sync module $522_{1,2}$, a buffer $524_{1,2}$ and a media engine $526_{1,2}$.

In an embodiment, data units broadcasted by the primary source are received (514) by the secondary source, which may use the data units to generate a secondary stream for synchronized playout with the primary stream, which may cause a secondary stream delay between the availability of data units at the output of the primary and secondary media source. In other embodiment, the delivery of the secondary stream via a CDN or a relatively slow IP network may cause a secondary stream delay. In an embodiment, the primary and secondary source generate independent but related media streams of which the timelines may be generator locked (genlocked) and/or correlated to a common timeline, for example according to section B.6 of "Digital Video Broadcasting (DVB); Companion Screens and Streams; Part 2: Content Identification and Media Synchronisation, DVB Document A167-2, July 2014". Further,—in some embodiments—the broadcasted data units of the primary stream may also be transmitted 507 to a cache server 516, which stores the data units for later use. Alternatively, the cache server may be provided with data units of the primary stream via another content source (not shown).

Hence, the system in FIG. 5 is similar to the system described with reference to FIG. 1 except that in FIG. 5 the primary and secondary stream are processed (rendered) in sync by at least primary media processing device and one or more secondary media processing devices. Platforms like the HbbTV platform support so-called companion screens (sometimes also referred to as a second screen, multiscreen, or secondary device). Media processing devices such as electronic tables or smartphones are configured as a secondary media processing device for presenting one or more secondary streams to a user that are in sync with a primary broadcast stream on a primary media processing device, e.g. a television. For example in a typical companion screen application the primary media processing device may be a television that renders the primary broadcast stream (e.g. a live-stream of a soccer game) and a secondary device may be an electronic tablet that renders the secondary stream (e.g. real-time analyses and commentary to the soccer game in a predetermined language). The companion screen may be configured and executed using a companion screen application that on the primary and secondary media processing devices. Hence, in case a user wants to use a device as second screen, a companion screen application needs to be installed on the device.

In order to accomplish a second screen, a companion screen (signaling) connection 530 between the secondary device and the primary device needs to be set up. The process of setting up such connection may include a discovery phase in which the devices announce themselves to each other. Known discovery protocols such as UPnP, DLNA, mDNS, DNS-SD or Bonjour may be used by a companion screen application during the discovery phase. In an embodiment, the companion screen application may announce the primary and secondary media processing devices on the local network, e.g. a Bluetooth, WiFi or WLAN network. A primary media processing device may listen for such announcements on the local network and select a suitable device for establishing a connection.

Alternatively, in another embodiment, a connection may be established using a common server in the network, such server may be referred to as a rendez-vouz server. This embodiment may be used if the secondary device does not have a local connection but instead is connected through a WAN, e.g. using UMTS or LTE. In this case, both the primary device and the secondary devices may be configured with the same rendez-vous server so that a connection may be established through that server.

In one embodiment, the companion screen connection may be realized by the companion screen applications directly. In another embodiment, the companion screen connection may be a general connection between the devices that allows for different applications to run on the secondary device. This secondary device may then contain an application launcher, which allows the primary device to signal to the secondary device to start a companion screen application (e.g. when changing channels or when a new TV program starts).

Once a companion screen connection between the primary and secondary devices is established, the connection may be used by the instant sync modules to exchange signaling messages in order to achieve instant synchronization. The first companion screen application on the primary media processing device and the second companion screen application in the secondary media processing device may request their respective streams and then achieve instant synchronization using the systems and methods as described in this application.

The companion screen connection 530 may be used to relay the messages from the primary media processing device to the secondary media processing device that are needed by the secondary media processing device to request (512) the secondary stream and—in some embodiments—to relay timing information associated with data units of the secondary stream 510 from the secondary media processing device to the primary media processing device in order for the primary media processing device to request a sync stream comprising a selection of cached data units 518 from the cache server 516. As in the embodiments described in relation to FIG. 1, in order to enable the cache server to provide the media processing device with a selection of cached data units, the cache server may be configured to receive a cache request 520 from the instant synchronization (sync) module 522.

Figure 6:
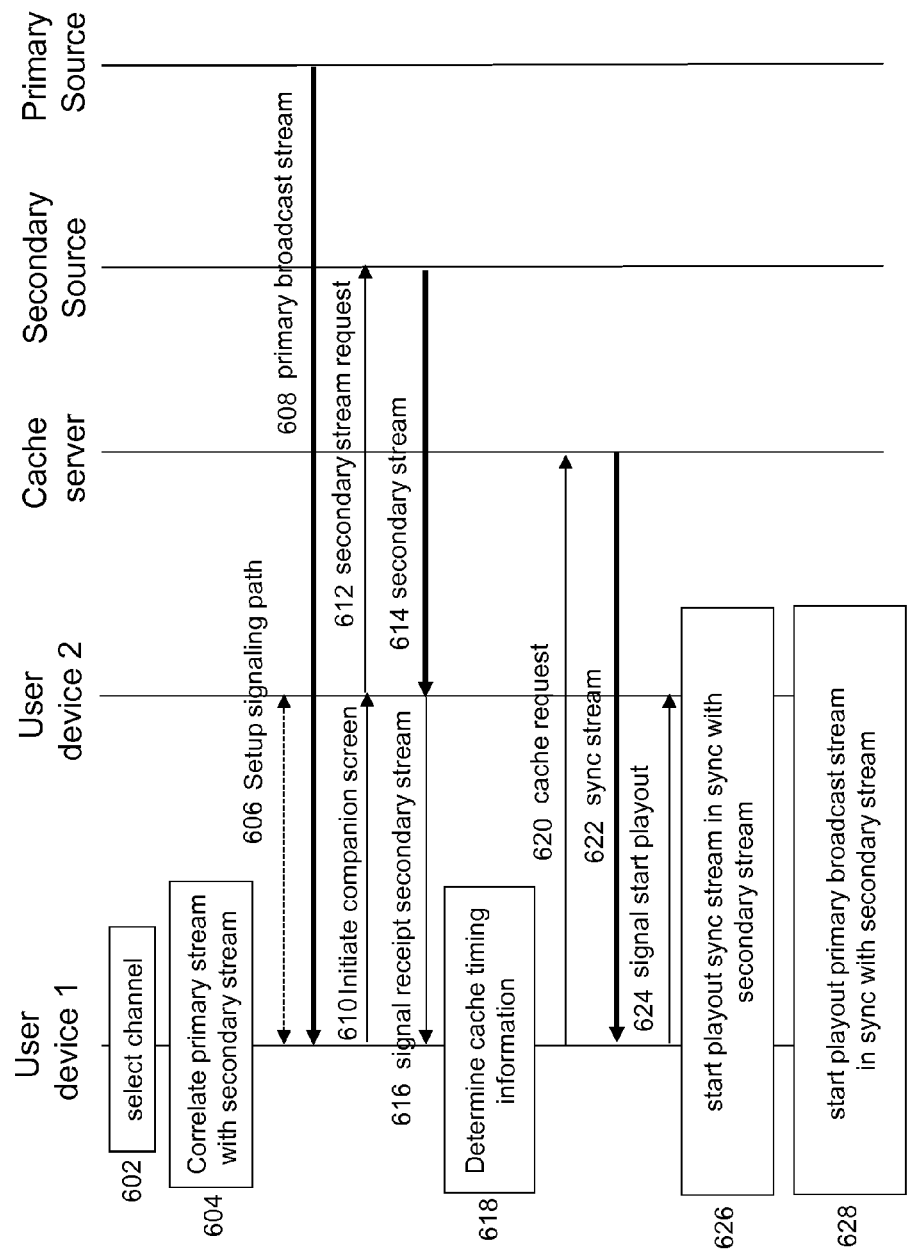
FIG. 6 depicts a flow diagram of a method for synchronizing the processing of a primary and a secondary stream according to another embodiment of the invention.

FIG. 6 depicts a flow diagram of a method for synchronizing the processing of a primary and a secondary stream according to another embodiment of the invention. The method may be executed in a system as described with reference to FIG. 5. The process may start with the selection of a broadcast channel (step 602). For example, a user may use the media processing device to select a channel, e.g. a (live) broadcast, on the basis of program or video information (e.g. program specific information) that is presented in a suitable format to the user via a graphical user interface, e.g. a TV, an electronic tablet, a smartphone or the like.

The selected broadcast may be correlated with program information on one or more secondary streams that are available for the selected broadcast (step 604). For example, the program specific information may comprise an AIT comprising location information, e.g. an URL, of a secondary media source that is configured to deliver a secondary stream to a secondary media processing device.

A first companion stream application in the primary media processing device may be configured to communicate with a second companion stream application in a secondary media processing device so that the secondary media processing device can be configured as a companion screen. To that end, the first companion stream application may identify one or more secondary devices that are (locally) connected via a suitable short distance (wireless) Bluetooth, WiFi or WiMax connection to the primary media processing device. The application in the primary media processing device may use known discovery techniques for searching and identifying devices in the neighborhood the primary device that are can be configured as a secondary media processing device. If a suitable secondary device is identified, a signaling path between the first companion screen application in the primary media processing device and the second companion screen application in the secondary media processing devices may be setup (step 606).

Meanwhile, the primary media processing device may start receiving and buffering data units from the primary broadcast stream (step 608). The time of reception of the data units, in particular the first data units, may be stored along with the data units. The companion stream application may initiate a companion screen session by sending the secondary media processing device a signaling message comprising location information, e.g. an URL, of a secondary media source that is configured to deliver the desired secondary stream (step 610). The secondary media processing device then may send a secondary stream request to the secondary media source (step 612). Alternatively, a secondary stream may be pushed to the secondary media processing device without the need for a request message. Thereafter the secondary media processing device may start receiving data units from the secondary media source (step 614). The time of reception of the data units, in particular the first data unit, of secondary stream by the secondary media processing device is reported back to the primary device (step 616).

On the basis of time of reception of the data units of the primary and secondary streams, the primary media processing device may determine cache timing information, e.g. the second stream delay Δ, (step 618) for the cache server. The timing information may further comprise a channel selection time, e.g. a time stamp representing the a time instance on the common content timeline associated with the user selecting the primary broadcast channel. The timing information may be sent to the cache server (step 620), which may use the cache timing information to select a data unit from the cache for starting the transmission of the sync stream to the media processing device. In an embodiment, the timing information may be sent in the cache request to the cache server.

The cache server may use the cache timing information to select a data unit from the cache for starting the transmission of the sync stream to the media processing device (step 622) in a similar way as described with reference to FIG. 4. The sync stream may comprise cache data units and content timeline information associated with the cache data units. When transmitting one or more of those data units in a sync stream to the media processing device, the primary media processing device may notify the reception of the sync stream (step 624) so that the primary media processing device and secondary media processing device may start processing data units from the sync stream and the secondary stream in sync (steps 626). During the synchronized processing of the data units, a data unit of the secondary stream may be going to be processed that has a corresponding data unit of the primary stream that coincides with the first data unit in the buffer that was sent directly from the primary source to the media processing device. At that point, the processing of the data units may switch to processing data units that are received directly from the primary stream (step 628). At that point, the transmission of the sync stream to the primary media processing device may be terminated.

Figure 7:
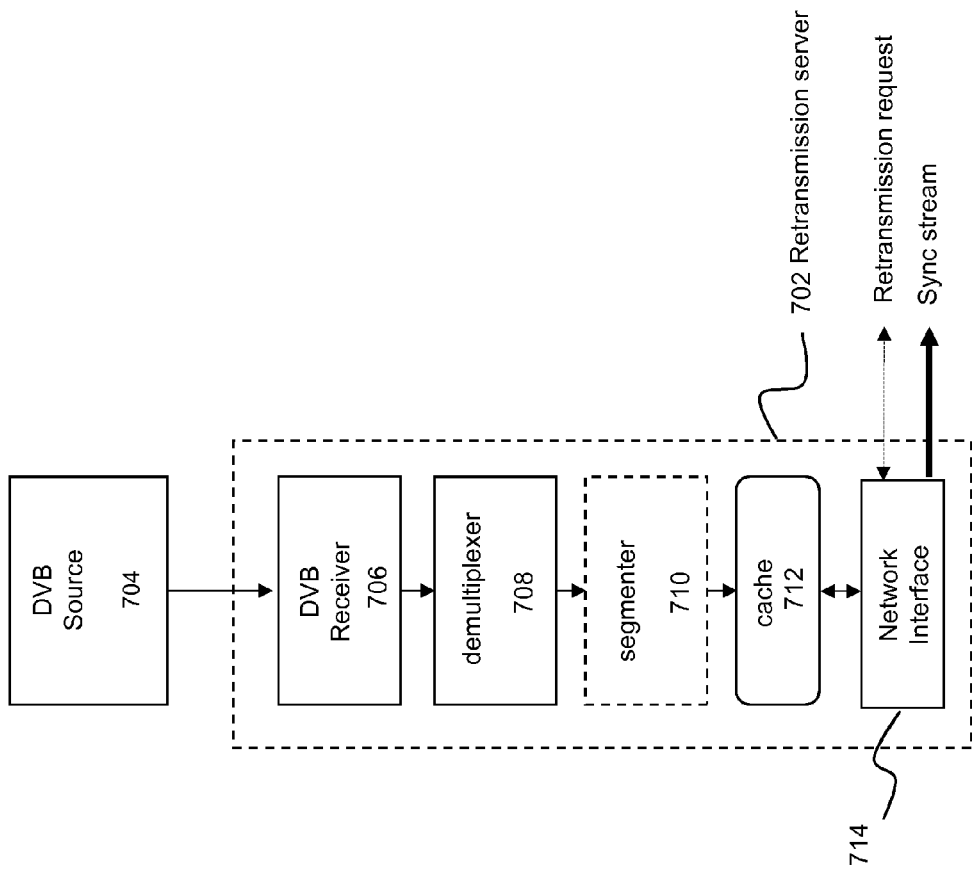
FIG. 7 depicts a cache server according to an embodiment of the invention.

FIG. 7 depicts a cache server 702 according to an embodiment of the invention. If the primary stream originating from a broadcast source 704 is a non-IP based modulated DVB stream, such as a DVB-S, DVB-T or DVB-C stream, the cache server requires functionality for transforming and storing the data units in the DVB stream in a format that allows the cache server to transmit cached data units in a sync stream (a unicast stream) to a media processing device (e.g. a user device).

To that end, the cache server may comprise a DVB receiver 706 (i.e. a DVB-S/T/C receiver) for receiving the modulated DVB stream, for demodulating it, and retrieving the MPEG-TS stream that is embedded in the DVB signal. The multiplexed MPEG-TS may then pass through a demultiplexer 708, which may select specific programs or PIDs for caching. Depending on the delivery method (e.g. an RTP streaming technique or adaptive streaming technique) used by the media processing device to retrieve data units from the cache 712, the cache server may either store the resulting MPEG-TS stream as a single file or as segments. In case it is stored as a file, byte ranges may be extracted from the file upon request. Alternatively, the MPEG-TS stream may be passed through a so-called segmenter 710 that formats the MPEG-TS stream in a plurality of segments, which are stored in the cache. In that case, the segmenter splits the MPEG-TS in smaller chunks that allow for easier retrieval and indexing. The server further comprises a network interface for receiving e.g. cache requests for media processing devices and for establishing a streaming connection with media processing devices.

While processing and storing the broadcast stream, (either as a single file or as separate chunks/segments), the information on the content timeline (the content timeline information) of the primary stream is maintained and stored along with the data units. The content timeline information allows the cache server to correlate incoming cache requests with the appropriate content in the cache (such as the proper byte range or the proper chunk). Depending on the particular implementation, the content timeline information may be in the form of timeline packets and/or values, e.g. SAD timeline packets, MPEG PTS values, RTP timestamps or the like.

When a media processing device requests a sync stream from the cache server, it may send cache timing information to the server, which may use the cache timing information in order to select data units from the cache. Depending on the delivery method that is used for the first and second media stream and the basis which is used to define the common content timeline, different embodiments may be used.

In an embodiment, the primary stream may be a DVB stream and the second media stream is an HTTP segmented stream (e.g. an MPEG DASH or Apple HLS stream). In that case, the primary stream may be prepared to have timeline packets, e.g. SAD timeline packets, that carry timestamps that represent the content timeline of the primary stream. In an embodiment, the timeline packets may form an absolute timeline. The media processing device, in particular the instant sync module in the media processing device, may use the time in the SAD timeline packets in order to determine cache timing information. In particular, the instant sync module may use time information in the DASH MPD (e.g. Period) or HLS manifest file (e.g. PROGRAM_TIME) for determining a reference (e.g. a frame number and/or a time stamp) of the first DASH or HLS segment it received as part of the second media stream. The thus determined reference may be used as a start time indicator representing a time instance on the common content timeline that is associated with a data unit in the cache that may be used as the data unit to start transmission of the sync stream. Similarly, in an embodiment, a reference (e.g. a frame number and/or timestamp) that is associated with the first data unit of the primary stream received by the media processing device may be used as an end time indicator, representing a time instance on the common content timeline that is associated with a data unit in the cache that may be used to end transmission of the sync stream.

Hence, in this particular embodiment, the timeline information in the manifest file associated with a first or one of the first received segments of the secondary stream and the timeline information in a timeline packet associated with a first, or one of the first, received data units of the primary stream is used to determine cache timing information that may be used by the cache server to start and stop transmission of the sync stream.

In a further embodiment, if the primary and secondary media stream are both MPEG-TS streams, the media processing device may use the PTS values from those streams in order to determine the cache timing information. In this particular embodiment, the media processing device may determine the PTS value of the first data unit it received from the secondary source as a start time indicator and the PTS value of the first data unit it received from primary source as the end indicator. The cache server may the cache timing information by sending all or at least part of the cached data units of the first media stream that are located on the common content timeline between the start time and the end time indicator.

In yet a further embodiment, if the second media stream is an RTP stream, the media processing device may use the RTP Timestamp value as the Start Indicator. Alternatively, it may use information from the RTCP Sender Reports to convert the RTP Timestamp into an NTP Timestamp and use the NTP timestamp as the start time indicator.

When a cache server receives a cache request that includes the cache timing information, it may use that information to select the data units that are going to be transmitted in a sync stream to the media processing device. In this scheme however there is no guarantee that the determined sync stream starts with a random-access data unit, i.e. a data unit such as an MPEG I-frame that can be rendered by the media processing device without the need for any additional data units. This means that it may not be possible for the media processing device to start playback of the first data unit it receives from the cache server thereby decreasing the effectiveness of the sync stream. Since the media processing device is typically not aware of the exact structure of the media content inside the DVB stream, e.g. the I-frame distribution, it is not possible or at least difficult for the media processing device to determine the cache timing information such that the cache server always selects a random-access data unit in the cache that is used for starting the transmission of the sync stream.

In order to solve this problem, the cache server may be configured to examine the data units of the primary stream so that it knows the distribution of the random-access data units. On the basis of the cache timing information the cache server may select a random-access data unit in the cache that is close or closest to the data unit that is selected on the basis of the cache timing information. This way, the media processing device may start decoding as soon as the first data unit in the sync stream is received.

In a further embodiment, the cache server may re-encode part of the data units that are sent in the sync stream to the media processing device. For example, even though frame X in the cached primary stream is not a random-access data unit, e.g. not an I-frame, the cache server may re-encode part of the data units including frame X before the sync stream is sent to the media processing device in order to make sure that frame X in the sync stream is a random-access data unit.

FIGS. 8A and 8B depict parts of manifest files according to various embodiments of the invention. In particular, FIG. 8A depicts part of a manifest file, e.g. an MPEG-DASH MPD, comprising location information, e.g. URLs, of segments representing the secondary stream. In an embodiment, the manifest file may further comprise location information 804, e.g. (part of) an URL, an IP address or an equivalent thereof, of the cache server. Hence, when a segmented secondary stream is requested, a manifest file may be sent to the media processing device for requesting the segments of the secondary stream and for obtaining location information of the cache server so that the media processing device is able to localize the cache server and to send cache requests to the cache server. The manifest file (e.g. an HTTP Adaptive Streaming based manifest file, such as a HLS or MPEG DASH manifest file) associated with the secondary stream, may also have been received by the media processing device, prior to 'zapping' to the channel on which the primary stream is received, for instance as part of a subscription. This means that the manifest file associated with (comprising segment identifiers of) the secondary stream is readily available at the moment the primary broadcast stream is being requested.

In embodiment the manifest file may also, or alternatively comprise segment identifiers associated with the sync stream. In an embodiment, the presence of location information of a cache server in the manifest file may be an indicator for the media processing device that the second stream is supported by an instant synchronization service and that the media processing device, in particular the instant sync module in the media processing device, needs to be configured for transmitting a cache request to the cache server and/or for receiving and processing a sync stream originating from the cache server.

In a further embodiment, the manifest file may comprise a reference to a primary broadcast stream 802, in this case a DVB broadcast program. The reference may have the form of a DVB program descriptor "DVB_ProgramID" for identifying a particular identifier of a broadcast program. Hence, in this embodiment, the media processing device may use the ProgramID in order to find the PMT table in the DVB stream and find the PIDs of the audio and video streams.

FIG. 8B depicts at least part of a manifest file according to an embodiment of the invention wherein the manifest file comprises location information 806 of the cache server and, optionally, the PID 808 of a primary broadcast stream that needs to be instantly synchronized with the one or more secondary streams as defined in the manifest file.

In this embodiment the manifest file is preferably made available to the media processing device, prior to the media processing device requesting the primary broadcast stream. The manifest file may then contain references (e.g. chunk (segment) identifiers) for retrieving the secondary stream, as well as a reference (e.g. URL for locating) to a cache server, so that at the moment the primary stream is requested, not only the cache request for the sync stream, as well as the appropriate, preferably latest available, chunk may be requested. The manifest file may be continuously updated, wherein updates may contain newly available chunks related to the secondary stream.

FIG. 9 depicts at least part of an AIT table according to an embodiment of the invention. As already describe earlier, the primary broadcast stream may include information for correlating a selected primary broadcast stream to a secondary stream.

In this particular example, the AIT table may comprise a RetransmissionCacheDescriptor 902 comprising location information 904, e.g. (part of) an URL, of the cache server. Along with the CacheDescriptor other information AdditionalSettings may be added for configuring the cache server (e.g. information on the available bandwidth or transmission rate). Further, the AIT may comprise an AuxiliaryContentDescriptor 908 comprising location information 9010, e.g. (part of) an URL, of a manifest file, e.g. a MPEG-DASH MPD.

Figure 10:
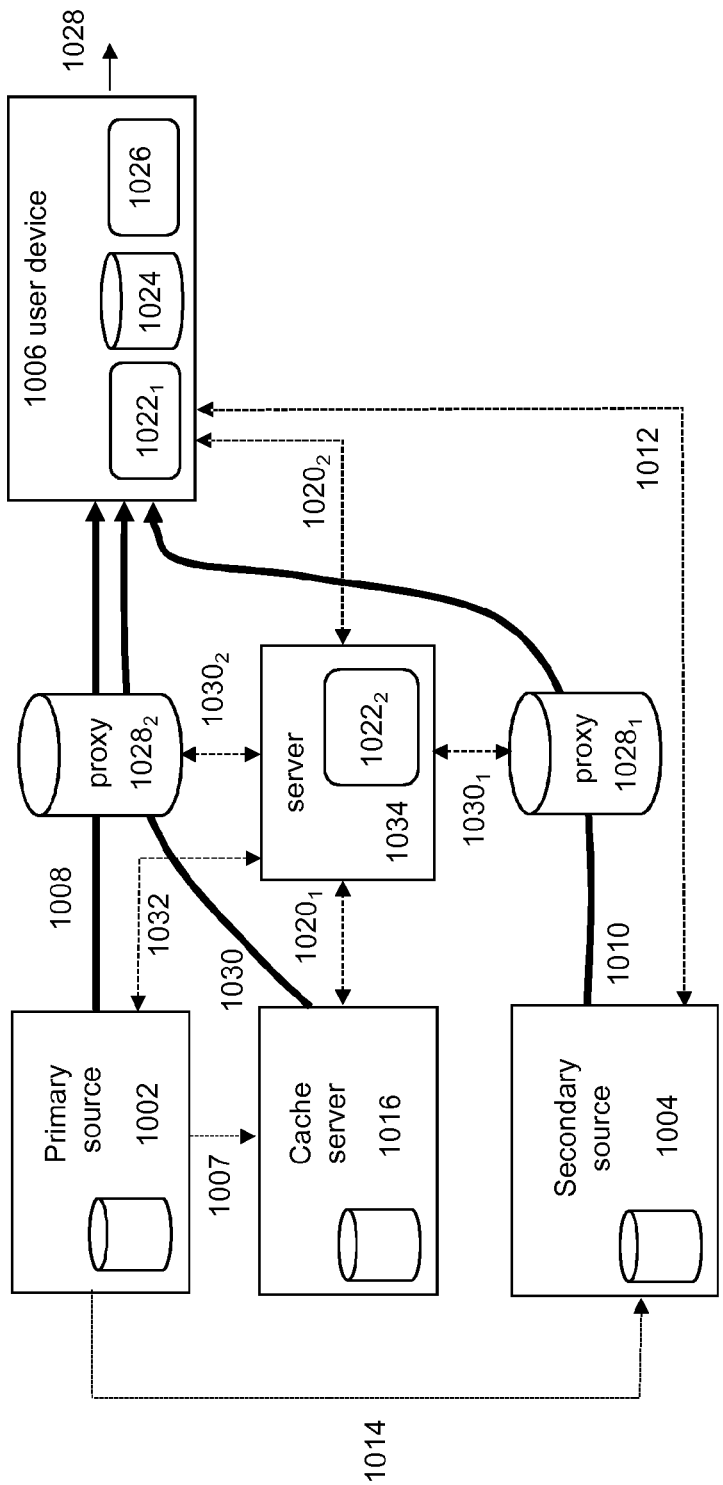
FIG. 10 depicts a system for synchronizing the processing of a primary and a secondary stream according to yet another embodiment of the invention.

FIG. 10 depicts a system for synchronizing the processing of a primary and a secondary stream according to another embodiment of the invention. The system may comprise a primary source 1002, one or more secondary sources 1004 and a cache server 1016 for transmitting a primary, secondary and a sync stream to a media processing device 1006 comprising a first sync module $1022_1$, a buffer 1024 and a media engine 1026 similar to the system in FIG. 5. In this particular embodiment, the system further comprises instant sync server 1034 that comprises a second sync module $1022_2$ that is configured to establish a connection $1020_1$ with the first sync module in the media processing device, a connection $1020_2$ with the cache server and one or more connections $1030_{1,2}$ with one or more proxy servers $1028_{1,2}$. The proxy servers may be located in the path of at least the primary and secondary stream. The proxy servers may monitor data units in the primary and secondary stream and generate timing information, e.g. the arrival time of a data unit in the stream at the proxy server.

The system in FIG. 10 may be part of an IPTV platform in which data units are provided in a multicast to media processing devices. A user interface, e.g. an electronic programming guide or the like, may allow a user to select a television program and one or more associated secondary streams. Upon selection, the media processing device may signal the server to join a multicast session originating from the primary source and send a secondary stream request to the secondary source. A suitable streaming protocol, e.g. the RTP streaming protocol, may be used to transport the data units to the media processing device. The first instant sync module in the media processing device may configure the buffer for receiving the primary and secondary stream and a sync stream.

The primary and secondary sources may start transmitted data units via the proxy servers to the media processing device and the proxy servers will inform the second instant sync module in the server at what time the first or one of the first data units of the primary and secondary stream have been passed through the proxy. In an embodiment, the proxy servers may use RTCP messages to inform the instant sync server on the arrival time of data units at the proxy servers. On the basis of the arrival time of the first data units that pass the proxy, the instant sync server may use the arrival time to determine cache timing information for the cache server. The instant sync server may send the cache timing information, including the time instance on the common content timeline associated with the channel selection, to the cache server, which—in return—will use the cache timing information to select a data unit in the cache (a cache data unit) for starting a sync stream to the media processing device in a similar way as described above with reference to FIG. 1-9. Hence, the system in FIG. 10 provides a network-based solution for instant synchronization of processing of data units of primary and one or more secondary streams by a media processing device. The system may also be used for implementing network-based instant synchronization for companion screen applications as described with reference to FIGS. 5 and 6.

The closer the proxy is to the receiver, e.g. in the home gateway near the receiver or in the edge of the network close to the local network of the receiver, to more accurate instant synchronization may be realized.

As the instant sync server will be unaware of the precise media units received by the primary receiver, the media processing device may signal the instant sync server to stop transmission of the sync stream by the cache server.

In another embodiment, if a proxy server is in the path of both the primary stream and the sync stream, the proxy may signal the instant sync server which data units are sent in the sync stream to the media processing device. This information may be used by the instant sync server to instruct the cache server when to stop transmission of data units to the media processing device.

In a further embodiment, the proxy server may receive the primary stream and the sync stream and combine the two streams into a new stream to the media processing device. This embodiment may be particularly advantageous if the proxy server is located close the receiver, e.g. in a home gateway or in a network node in the edge of the (IPTV) network. These advantages are caused by the fact that streams at the edge of the network already have unicast behavior so that modifications of the stream may be realized on a per-receiver basis. In yet another embodiment, the proxy server and the cache server may be integrated so that no signaling connection between the proxy and cache server is required.

Figure 11:
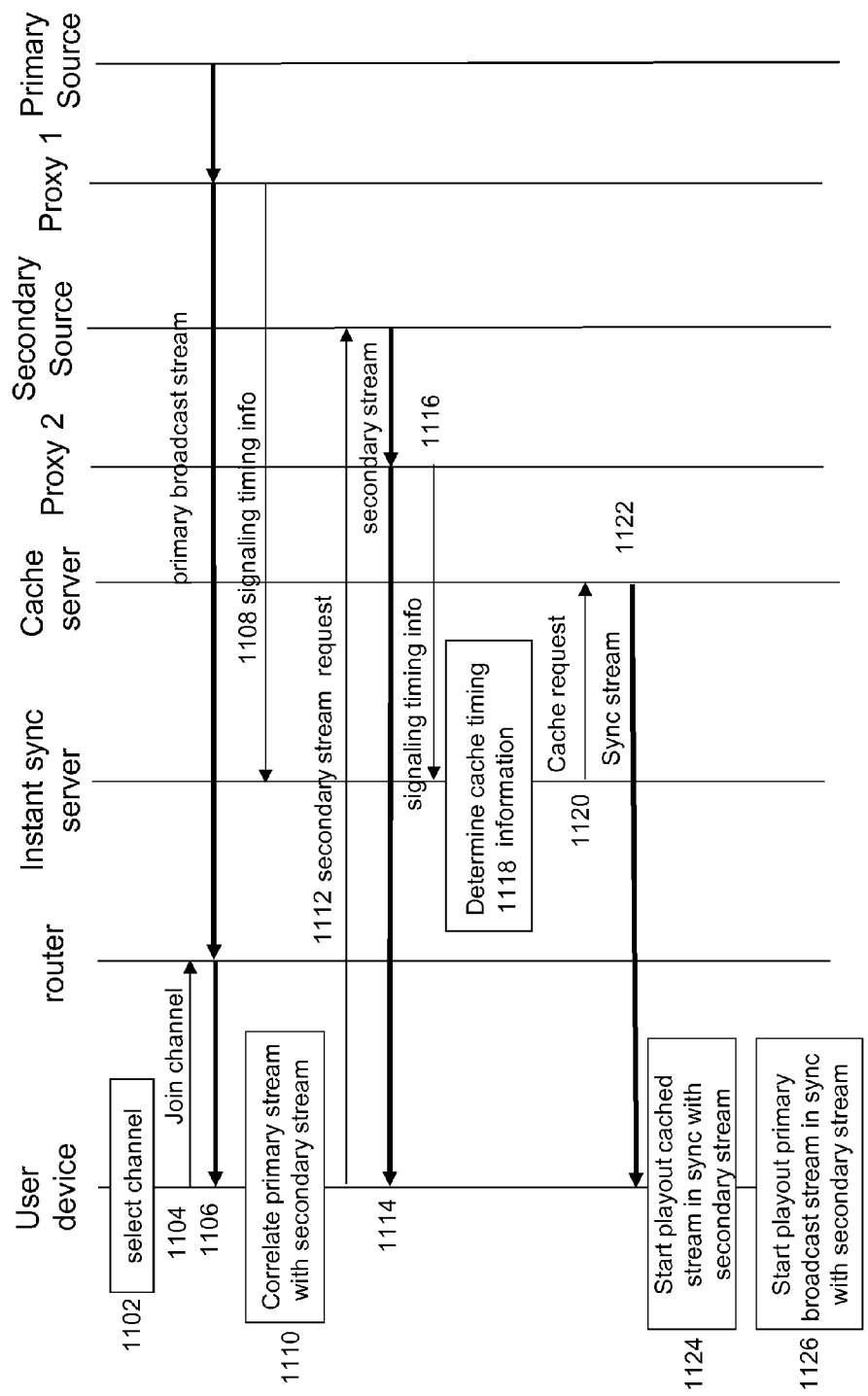
FIG. 11 depicts a flow diagram of a method for synchronizing the processing of a primary and a secondary stream according to yet another embodiment of the invention.

FIG. 11 depicts a flow diagram of a method for instant synchronization of the processing of a primary and a secondary stream according to yet another embodiment of the invention. This method may be implemented in a system as e.g. described with reference to FIG. 10. The process may start with a user selecting a television channel (step 1102), which initiates the media processing device to send a join request for joining a multicast session associated with the selected television program, e.g. a live stream. In response, the media processing device may receive a primary broadcast stream, e.g. an RTP multicast stream (step 1106). During the transmission of the broadcast stream, a proxy in the path of the primary stream may detect the arrival of data units and notify the arrival time of data units by the proxy to the instant sync server (step 1108). Further, the media processing device may correlate the selected primary stream with a secondary stream (step 1110) and send a secondary stream request to a secondary media source (step 1112). Thereafter, the secondary stream may start the transmission of the secondary stream to the media processing device (step 1114). Also during the transmission of the secondary stream, a proxy in the path of the secondary stream may detect the arrival of data units and notify the arrival time of data units by the proxy to the instant sync server (step 1116).

The signaled reception time of the first data unit of the primary and secondary stream may be used by the instant sync server to determine timing information for the cache server (step 1118). The instant sync server may send the timing information and a time instance on the common content timeline associated with the selection of the television in a cache request to the cache server (step 1120). In response to the cache request, the cache server may select a data unit in the cache for starting transmission of a sync stream (which may include content timeline information of cache data units of the sync stream) to the media processing device (step 1122). Thereafter, the media processing device may start the synchronized processing of data units in the sync stream and the secondary stream (step 1124). Once the data units in the sync streams are processed, the media processing device may switch to the synchronized playout of data units of the primary and secondary stream (step 1126).

Figure 12:
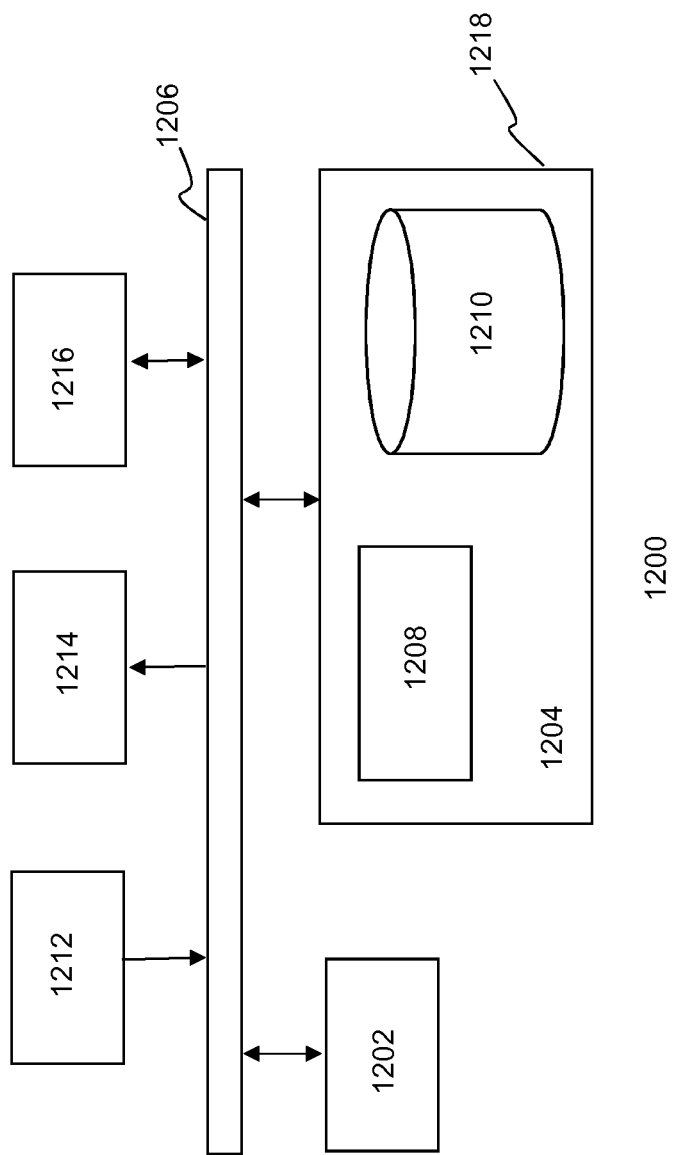
FIG. 12 depicts a schematic of a client or server system.

FIG. 12 is a block diagram illustrating an exemplary data processing system that may be used in as described in this disclosure. Data processing system 1200 may include at least one processor 1202 coupled to memory elements 1204 through a system bus 1206. As such, the data processing system may store program code within memory elements 1204. Further, processor 1202 may execute the program code accessed from memory elements 1204 via system bus 1206. In one aspect, data processing system may be implemented as a computer that is suitable for storing and/or executing program code. It should be appreciated, however, that data processing system 1200 may be implemented in the form of any system including a processor and memory that is capable of performing the functions described within this specification.

Memory elements 1204 may include one or more physical memory devices such as, for example, local memory 1208 and one or more bulk storage devices 1210. Local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from bulk storage device 1210 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 250.

As pictured in FIG. 12, memory elements 1204 may store an application 1218. It should be appreciated that data processing system 1200 may further execute an operating system (not shown) that can facilitate execution of the application. Application, being implemented in the form of executable program code, can be executed by data processing system 1200, e.g., by processor 1202. Responsive to executing application, data processing system may be configured to perform one or more operations to be described herein in further detail.

In one aspect, for example, data processing system 1200 may represent a client data processing system. In that case, application 1218 may represent a client application that, when executed, configures data processing system 1200 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1218, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for enabling synchronization of processing of data units associated with a primary media stream and of one or more secondary media streams by at least one media processing device, the processing being based on a common content timeline of the primary and the one or more secondary media streams, the method being carried out by one or more processors of the at least one media processing device, the method comprising:
    selecting a primary media stream that is broadcasted by a broadcast source in a network, the primary media stream being associated with at least one secondary media stream;
    in response to selecting the primary media stream, receiving at the at least one media processing device data units transmitted in the primary media stream via the network by the broadcast source;
    transmitting to at least one cache server a cache request including cache timing information associated with a time difference between the processing of at least one data unit of the primary media stream that is associated with a time instance on the common content timeline and the processing of at least one data unit of the at least one secondary media stream that is associated with a time instance on the common content timeline that corresponds to the time instance of the at least one data unit of the primary stream; and
    at the at least one media processing device, receiving from the at least one cache server one or more cache data units selected by the at least one cache server on the basis of the cache timing information, wherein at least part of the cache data units correspond to particular data units of the primary media stream, and wherein the particular data units were already broadcasted by the broadcast source at the time the primary media stream was selected by the at least one media processing device,
    wherein processing data units of the primary media stream comprises carrying out at least one processing step for transforming the data units of the primary media stream into a signal for display,
    and wherein processing data units of the secondary media stream comprises carrying out at least one processing step for transforming the data units of the secondary media stream into a signal for display.

2. The method according to claim 1, wherein receiving the one or more cache data units comprises:
    receiving content timeline information associated with the one or more cache data units, the content timeline information correlating the cache data units to the common content timeline, the content timeline information being at least one of timeline data, the timeline data being at least one of: DVB synchronized auxiliary data (SAD) timeline packets, RTP timestamps, or presentation timestamps.

3. The method according to claim 1, wherein at least part of the one or more cache data units form a sync stream originating from the cache server, and wherein the method further comprises:
    receiving data units of the at least one secondary stream; and
    processing at least part of one or more cache data units in synchronization with corresponding data units of the received secondary stream.

4. The method according to claim 1, further comprising:
    determining at least part of the cache timing information on the basis of one of:
    time information associated with processing of a first data unit or one of the first data units of the primary and of the at least one secondary stream by the at least one media processing device, or
    time information associated with passage of the first data unit or one of the first data units of the primary and of the secondary stream at one or more proxy servers that are located in a path of the primary and secondary stream.

5. The method according to claim 1, wherein selecting the primary stream comprises:
    receiving program information related to the primary media stream, the program information being embedded in the primary media stream, the program information being at least one of:
    an instant sync indicator for triggering an instant synchronization module in the at least one media processing device to configure the at least one media processing device for receiving the cache data;
    cache-server location information for locating the cache server, the cache-server location information being one of at least part of a URL, or an IP address;
    data media-source location information for locating a media source configured for sending data units of the primary stream and/or at least one of the one or more secondary media streams, the data media-source location information being at least part of a URL; or
    file media-source location information for locating a media source configured for sending a manifest file associated with the primary media stream and/or, at least one of the one or more secondary media streams to the at least one media processing device, the file media-source location information being one of at least part of a URL, or an IP address.

6. The method according to claim 1, further comprising:
    receiving location information for locating the cache server, the location information being at least part of a URL; and
    using the location information to send a cache request to the cache server, the cache request comprising the said timing information.

7. The method according to claim 1, wherein at least part of the one or more cache data units form a sync stream originating from the cache server, and wherein the method further comprises:
    the cache server using the cache timing information to select at least one data unit in the cache to start the transmission of the sync stream to the at least one media processing device.

8. The method according to claim 1, wherein at least part of the one or more cache data units form a sync stream originating from the cache server, and wherein the common content timeline correlates data units of the primary media stream and data units of the sync stream with data units of the at least one or more secondary media streams.

9. The method according to claim 1, wherein the primary media stream and/or the secondary media stream comprise or are associated with content timeline information for establishing a common content timeline between the primary and secondary media stream, the content timeline information comprising elements, the elements be at least one of: timeline packets, DVB synchronized auxiliary data (SAD) timeline packets, RTP timestamps, presentation timestamps, content timeline information in a manifest file representing at least part of the primary and/or secondary media stream.

10. The method according to claim 1, wherein the synchronization is established between at least a primary media processing device for receiving the primary stream and at least one secondary media processing device for receiving the at least one of the one or more secondary media streams, the at least one secondary media processing device being configured as a HbbTV compliant companion screen.

11. The method according to claim 10, further comprising:
   establishing a communication connection between the at least one first and second media processing devices;
   in response to the selection of the primary media source, instructing the at least one secondary media processing device via the communication connection to request the secondary media stream;
   the at least one primary media processing device receiving at least part of the one or more cache data units in a sync stream originating from the cache server; and
   the at least one primary media processing device instructing the at least one secondary media processing device via the communication connection to start processing data units of the secondary stream that correspond to the one or more cache data units received by the at least one primary media processing device.

12. The method according to claim 1, further comprising:
   storing a data structure configured for enabling instant synchronization of processing of data units of the primary media stream and of one or more secondary streams by the at least one media processing device, the data structure comprising structure elements, the structure elements being at least one of:
   an instant sync indicator for triggering a sync module in the at least one media processing device for configuring the at least one media processing device for receiving the cache data from a cache server;
   cache-server location information for enabling the at least one media processing device to locate the cache server, the cache-server location information being one of at least part of a URL, or an IP address;
   data media-source location information for enabling the at least one media processing device to locate a media source configured for sending data units of the primary stream and/or at least one of the one or more secondary media streams to the at least one media processing device, the data media-source location information being one of at least part of a URL, or an IP address; or
   file media-source location information for enabling the at least one media processing device to locate a media source, the media source being configured for sending a manifest file associated with the primary media stream and/or, for sending at least one of the one or more secondary media streams to the at least one media processing device.

13. A media processing device for synchronization of processing of data units of a primary media stream and of one or more secondary streams, the processing being based on a common content timeline of the primary and the one or more secondary media streams, the media processing device comprising:
   one or more processors; and
   memory storing computer readable program instructions that when executed by the one or more processors cause the media processing device to carry out operations including:
   selecting a primary media stream that is broadcasted by a broadcast source in a network, the primary media stream being associated with at least one secondary media stream;
   in response to selecting the primary media stream, receiving at the media processing device data units transmitted in the primary media stream via the network by the broadcast source;
   transmitting to at least one cache server a cache request including cache timing information associated with a time difference between at least one data unit of the primary media stream that is associated with a time instance on the common content timeline and at least one data unit of the at least one secondary media stream that is associated with a time instance on the common content timeline that corresponds to the time instance of said at least one data unit of the primary stream; and
   receiving from the at least one cache server one or more cache data units selected by the at least one cache server on a basis of the cache timing information, wherein at least part of the cache data units correspond to data particular units of the primary media stream, and wherein the particular data units were already broadcasted by the broadcast source at the time the primary media stream was selected by the media processing device,
   wherein processing data units of the primary media stream comprises carrying out at least one processing step for transforming the data units of the primary media stream into a signal for display,
   and wherein processing data units of the secondary media stream comprises carrying out at least one processing step for transforming the data units of the secondary media stream into a signal for display.

14. A cache node for enabling synchronization of processing of data units of a primary media stream and of one or more secondary streams by at least one media processing device, the cache node comprising:
   one or more processors; and
   memory storing computer readable program instructions that when executed by the one or more processors cause the cache node to carry out operations including:
   storing cache data units, the cache data units being copies of data units of the primary media stream that are broadcasted by a broadcast source;
   storing content timeline information associated with the primary media stream, the content timeline information providing a common content timeline between the primary and secondary media stream in a memory of the cache node;
   receiving a cache request transmitted from a media processing device, the cache request being generated in response to the media processing device selecting the primary media stream;
   selecting one or more cache data units on the basis of cache timing information in the cache request, the cache timing information being associated with a time difference between the processing by the media processing device of at least one data unit of the primary media stream that is associated with a time instance on the common content timeline and the processing of at least one data unit of the at least one secondary media stream that is associated with a time instance on the common content timeline that corresponds to the time instance of the at least one data unit of the primary stream, wherein at least part of the selected cache data units correspond to particular data units of the primary media stream that were already broadcasted by the broadcast source at the time the primary media stream was selected; and transmitting the one or more selected cache units to the media processing device, wherein processing data units of the primary media stream comprises carrying out at least one processing step for transforming the data units of the primary media stream into a signal for display, and wherein processing data units of the secondary media stream comprises carrying out at least one processing step for transforming the data units of the secondary media stream into a signal for display.

15. A non-transitory computer-readable medium having instructions store thereon that, when executed by one or more processors of at least one media processing device, cause the at least one media processing device to carry out operations for synchronization of processing of data units associated with a primary media stream and of one or more secondary media streams, wherein the processing is based on a common content timeline of the primary and the one or more secondary media streams, and wherein the operations include:

selecting a primary media stream that is broadcasted by a broadcast source in a network, the primary media stream being associated with at least one secondary media stream;

in response to selecting the primary media stream, receiving at the at least one media processing device data units transmitted in the primary media stream via the network by the broadcast source;

transmitting to at least one cache server a cache request including cache timing information associated with a time difference between the processing of at least one data unit of the primary media stream that is associated with a time instance on the common content timeline and the processing of at least one data unit of the at least one secondary media stream that is associated with a time instance on the common content timeline that corresponds to the time instance of the at least one data unit of the primary stream; and at the at least one media processing device, receiving from the at least one cache server one or more cache data units selected by at least one cache server on the basis of the cache timing information, wherein at least part of the cache data units correspond to particular data units of the primary media stream, and wherein the particular data units were already broadcasted by the broadcast source at the time the primary media stream was selected by the at least one media processing device, wherein processing data units of the primary media stream comprises carrying out at least one processing step for transforming the data units of the primary media stream into a signal for display, and wherein processing data units of the secondary media stream comprises carrying out at least one processing step for transforming the data units of the secondary media stream into a signal for display.

16. The non-transitory computer-readable medium according to claim 15, wherein the operations further include:

storing a data structure configured for enabling instant synchronization of processing of data units of the primary media stream and of one or more secondary streams by the at least one media processing device, the data structure comprising structure elements, the structure elements being at least one of:

an instant sync indicator for triggering a sync module in the at least one media processing device for configuring the at least one media processing device for receiving the cache data from a cache server;

cache-server location information for enabling the at least one media processing device to locate the cache server, the cache-server location information being one of at least part of a URL, or an IP address;

data media-source location information for enabling the at least one media processing device to locate a media source configured for sending data units of the primary stream and/or at least one of the one or more secondary media streams to the at least one media processing device, the data media-source location information being one of at least part of a URL, or an IP address; or file media-source location information for enabling the at least one media processing device to locate a media source, the media source being configured for sending a manifest file associated with the primary media stream and/or, for sending at least one of the one or more secondary media streams to the at least one media processing device.

* * * * *